US008823868B2

(12) United States Patent
Tashiro

(10) Patent No.: US 8,823,868 B2
(45) Date of Patent: Sep. 2, 2014

(54) DEVICE, IMAGING APPARATUS, IMAGING SYSTEM, METHOD FOR CONTROLLING DEVICE, AND PROGRAM

(75) Inventor: Kazuya Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 13/064,609

(22) Filed: Apr. 4, 2011

(65) Prior Publication Data

US 2011/0292225 A1 Dec. 1, 2011

(30) Foreign Application Priority Data

May 27, 2010 (JP) ................................ 2010-121915

(51) Int. Cl.
H04N 5/225 (2006.01)
H04N 5/232 (2006.01)
G03B 17/14 (2006.01)
G03B 17/18 (2006.01)

(52) U.S. Cl.
CPC ............ *H04N 5/23225* (2013.01); *G03B 17/14* (2013.01); *G03B 17/18* (2013.01)
USPC ....................................... 348/360; 348/207.1

(58) Field of Classification Search
USPC ................. 348/187, 207.99, 360, 362, 207.1, 348/207.11, 340; 396/296, 529; 710/62; 714/47.1, 2; 717/168; 711/154
See application file for complete search history.

(56) References Cited

U.S. PATENT DOCUMENTS

| 6,374,315 | B1* | 4/2002 | Okada et al. ..................... 710/62 |
| 2001/0030813 | A1* | 10/2001 | Kaneko et al. ................ 359/697 |
| 2005/0132351 | A1* | 6/2005 | Randall et al. ................. 717/168 |
| 2006/0075276 | A1* | 4/2006 | Kataria et al. ..................... 714/4 |
| 2006/0092312 | A1* | 5/2006 | Tanaka .......................... 348/340 |
| 2006/0171707 | A1* | 8/2006 | Higuma ........................ 396/529 |
| 2007/0046808 | A1* | 3/2007 | Sagawa et al. ................ 348/362 |
| 2008/0183981 | A1* | 7/2008 | Tannai .......................... 711/154 |
| 2009/0238553 | A1* | 9/2009 | Tamura ......................... 396/296 |
| 2011/0208993 | A1* | 8/2011 | Samoilova et al. ............... 714/2 |

FOREIGN PATENT DOCUMENTS

JP 2009-260949 11/2009

* cited by examiner

*Primary Examiner* — Dennis Hogue
(74) *Attorney, Agent, or Firm* — Rader, Fishman & Grauer PLLC

(57) ABSTRACT

A device includes: an interface for performing communication with an apparatus to which the device is connected; and a supplying section that supplies support information, for notifying functions supported and controlled by the apparatus based on a detection result provided from a detecting section that detects a malfunction associated with a program held in a holding section, to the apparatus.

22 Claims, 13 Drawing Sheets

FIG.5A
WHEN DETECTION RESULT SHOWS THAT FIRMWARE IS FUNCTIONING PROPERLY

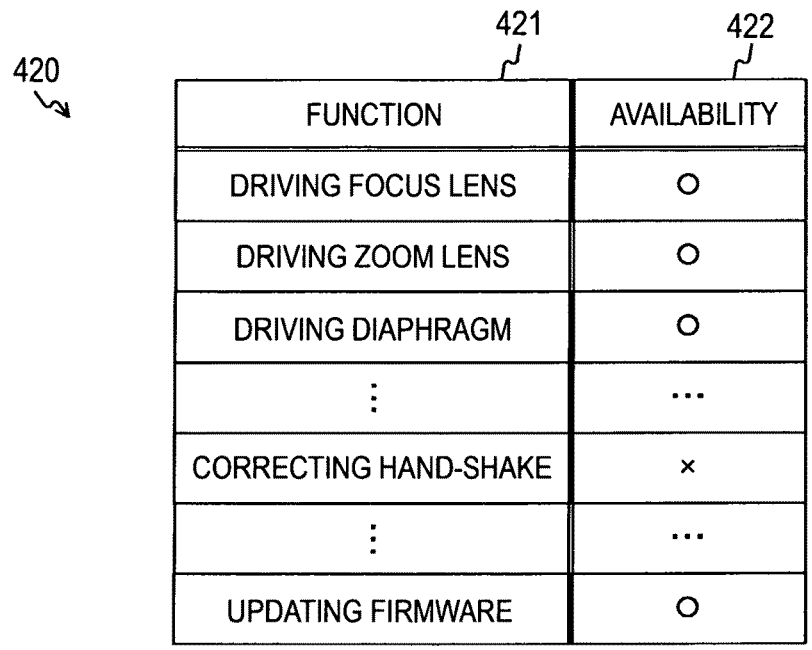

| FUNCTION | AVAILABILITY |
|---|---|
| DRIVING FOCUS LENS | ○ |
| DRIVING ZOOM LENS | ○ |
| DRIVING DIAPHRAGM | ○ |
| ⋮ | … |
| CORRECTING HAND-SHAKE | × |
| ⋮ | … |
| UPDATING FIRMWARE | ○ |

FIG.5B
WHEN DETECTION RESULT SHOWS THAT FIRMWARE IS MALFUNCTIONING

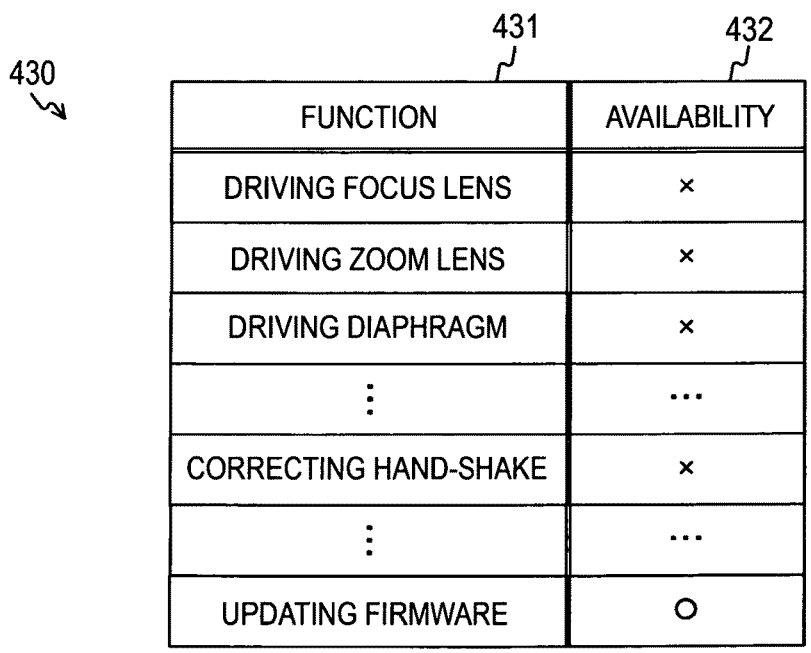

| FUNCTION | AVAILABILITY |
|---|---|
| DRIVING FOCUS LENS | × |
| DRIVING ZOOM LENS | × |
| DRIVING DIAPHRAGM | × |
| ⋮ | … |
| CORRECTING HAND-SHAKE | × |
| ⋮ | … |
| UPDATING FIRMWARE | ○ |

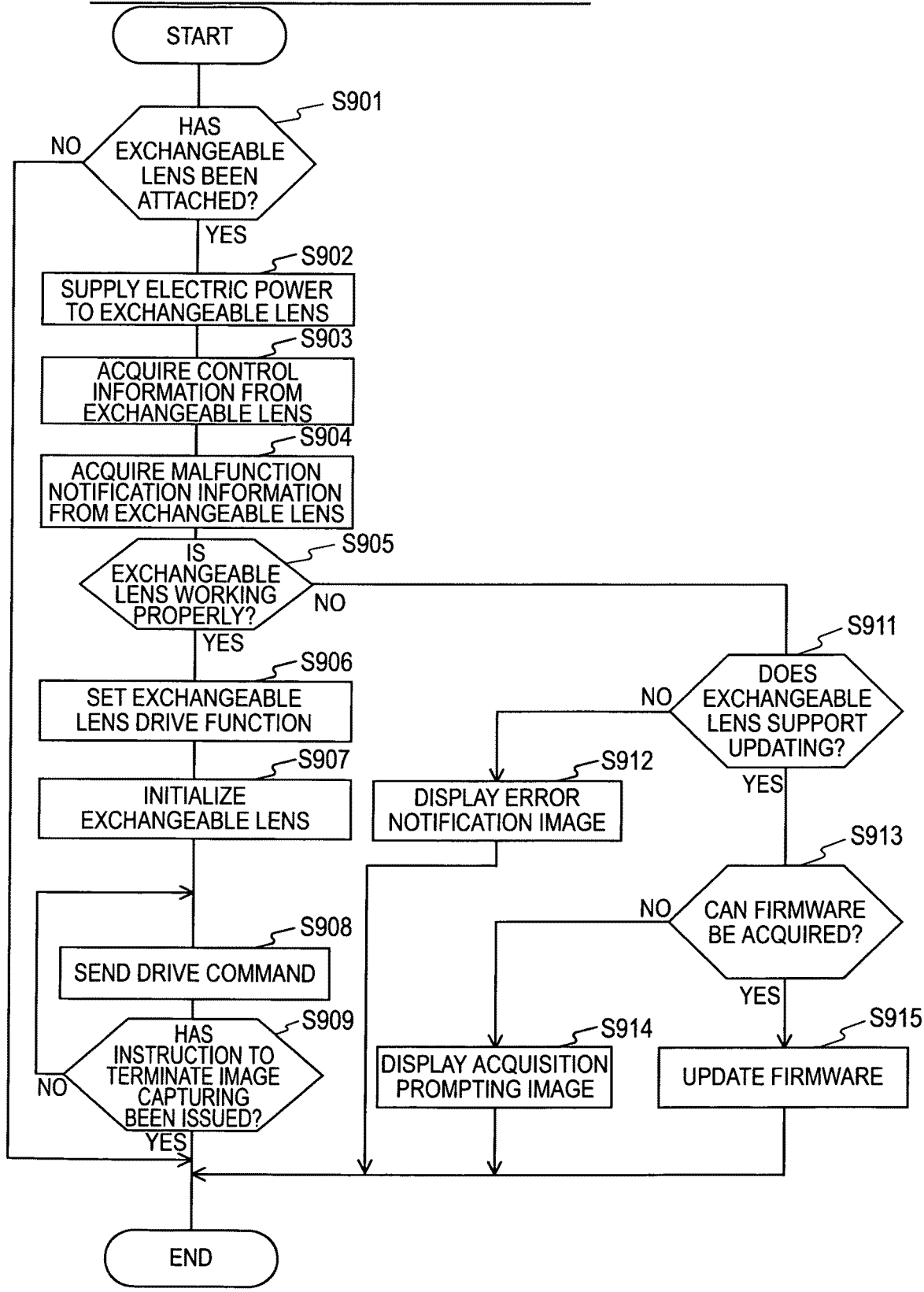

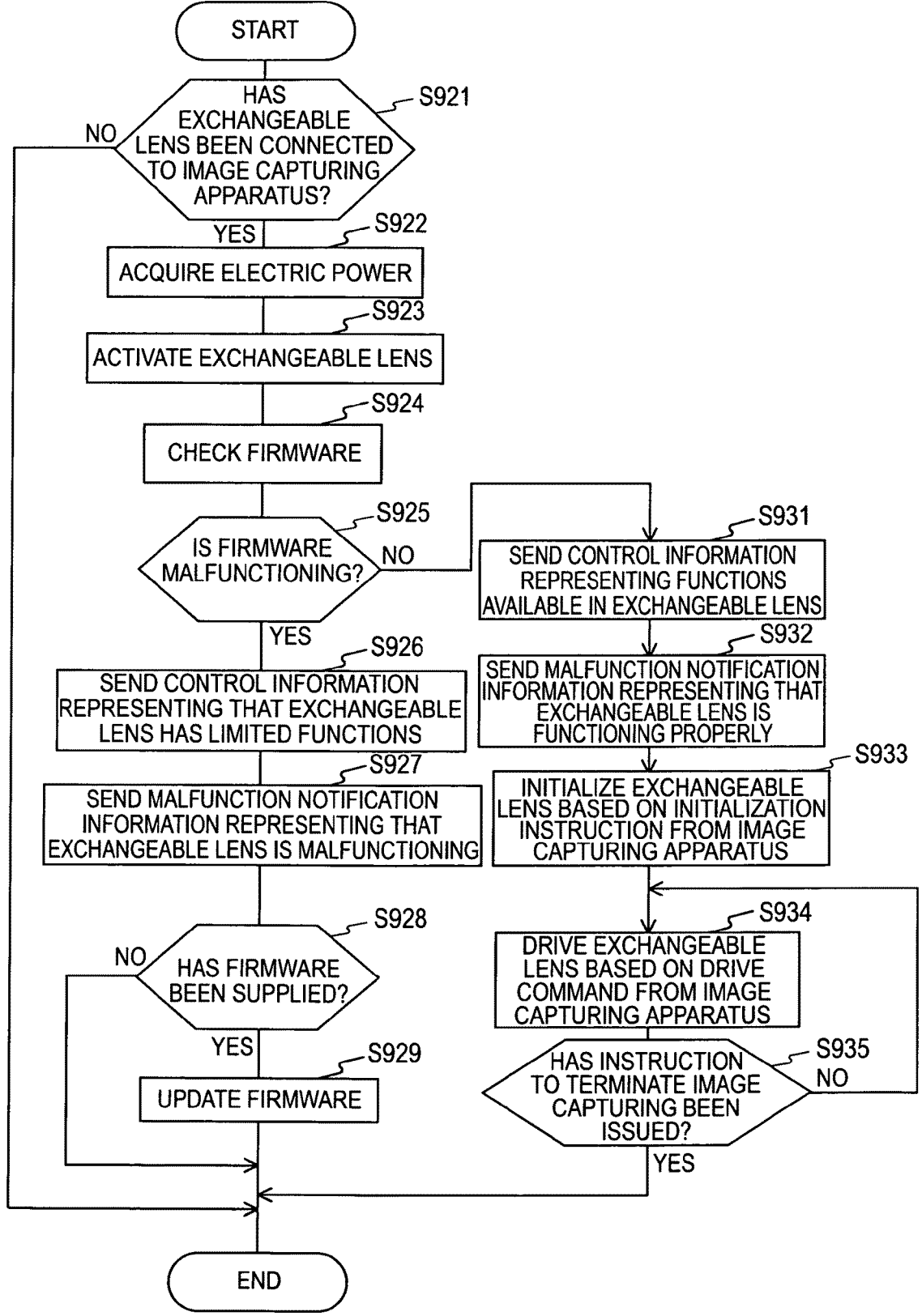

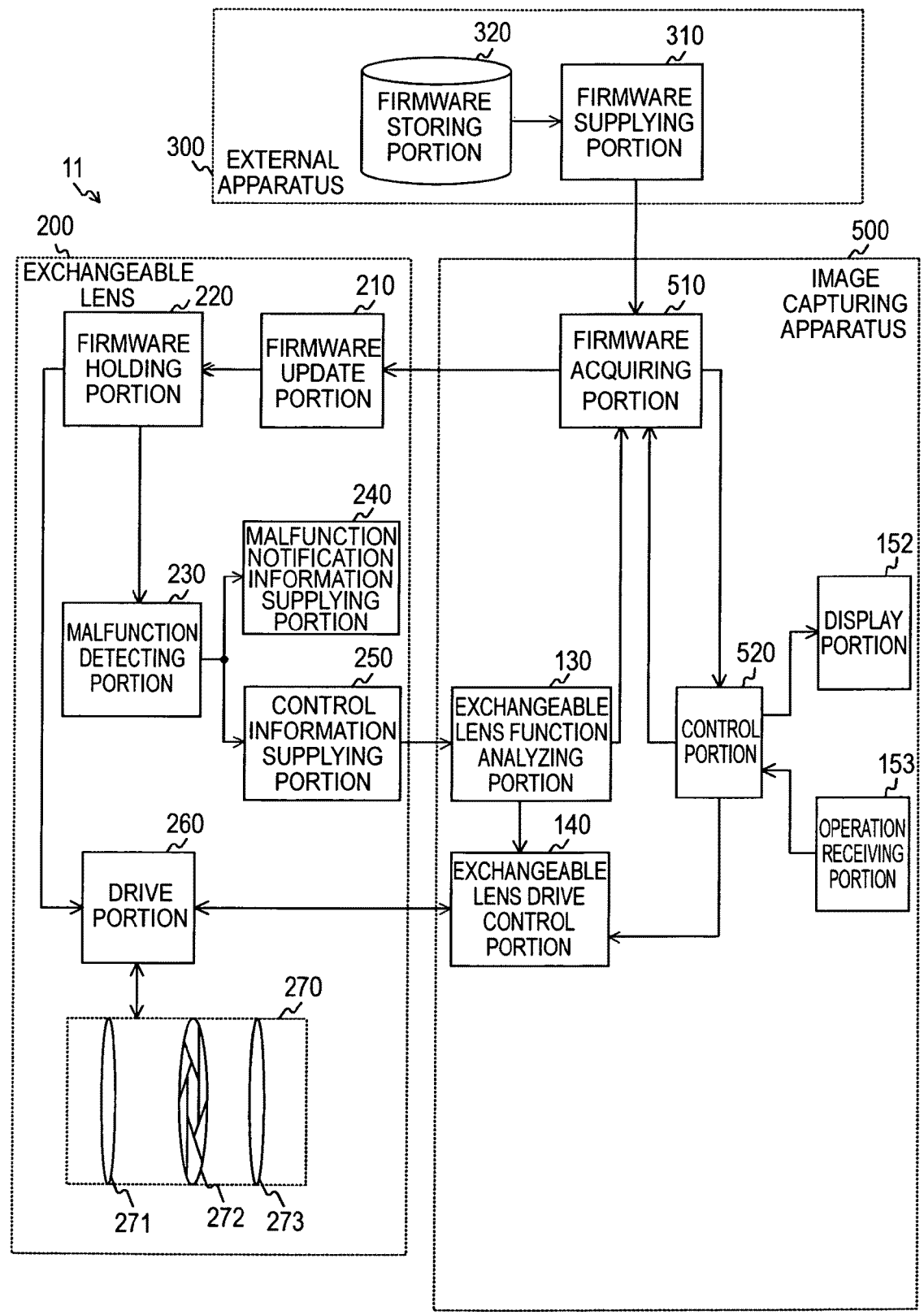

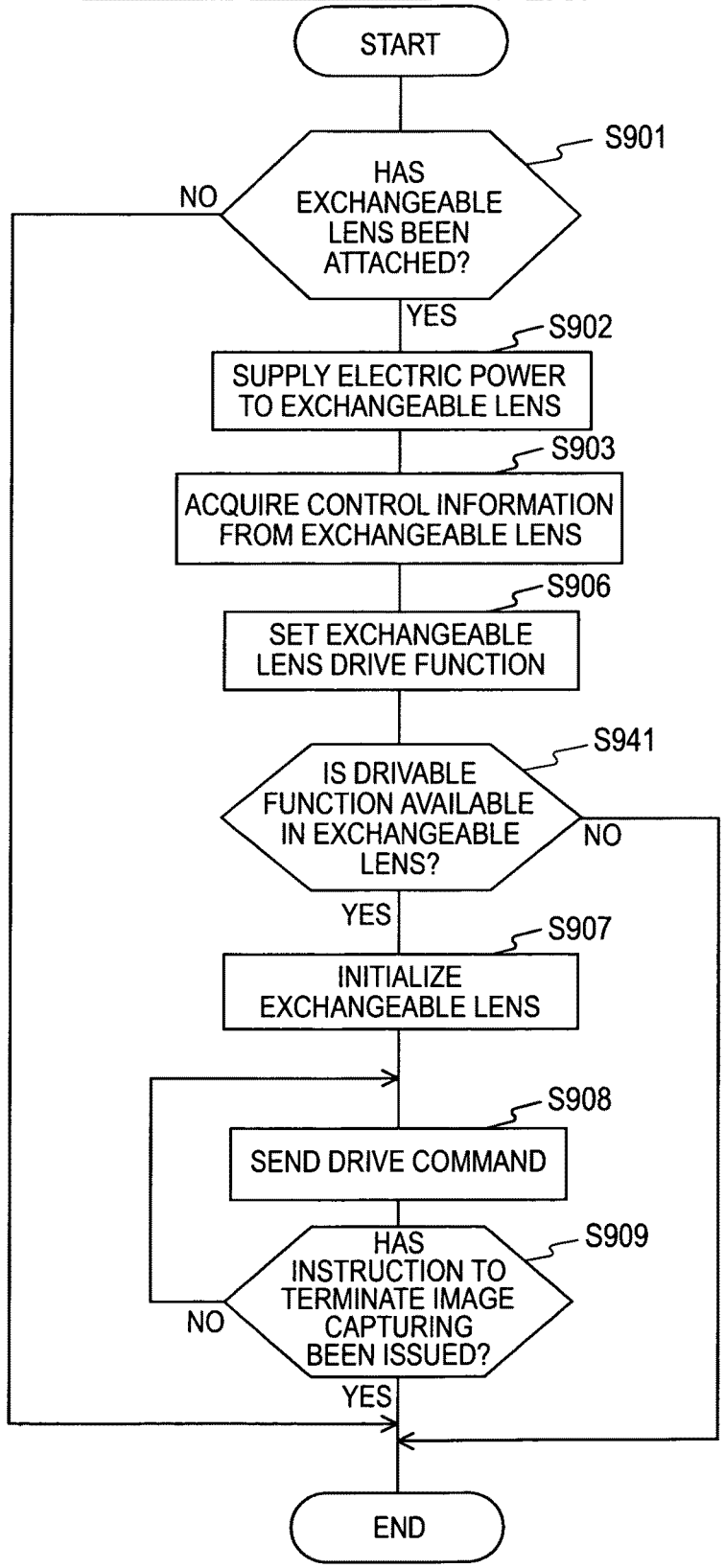

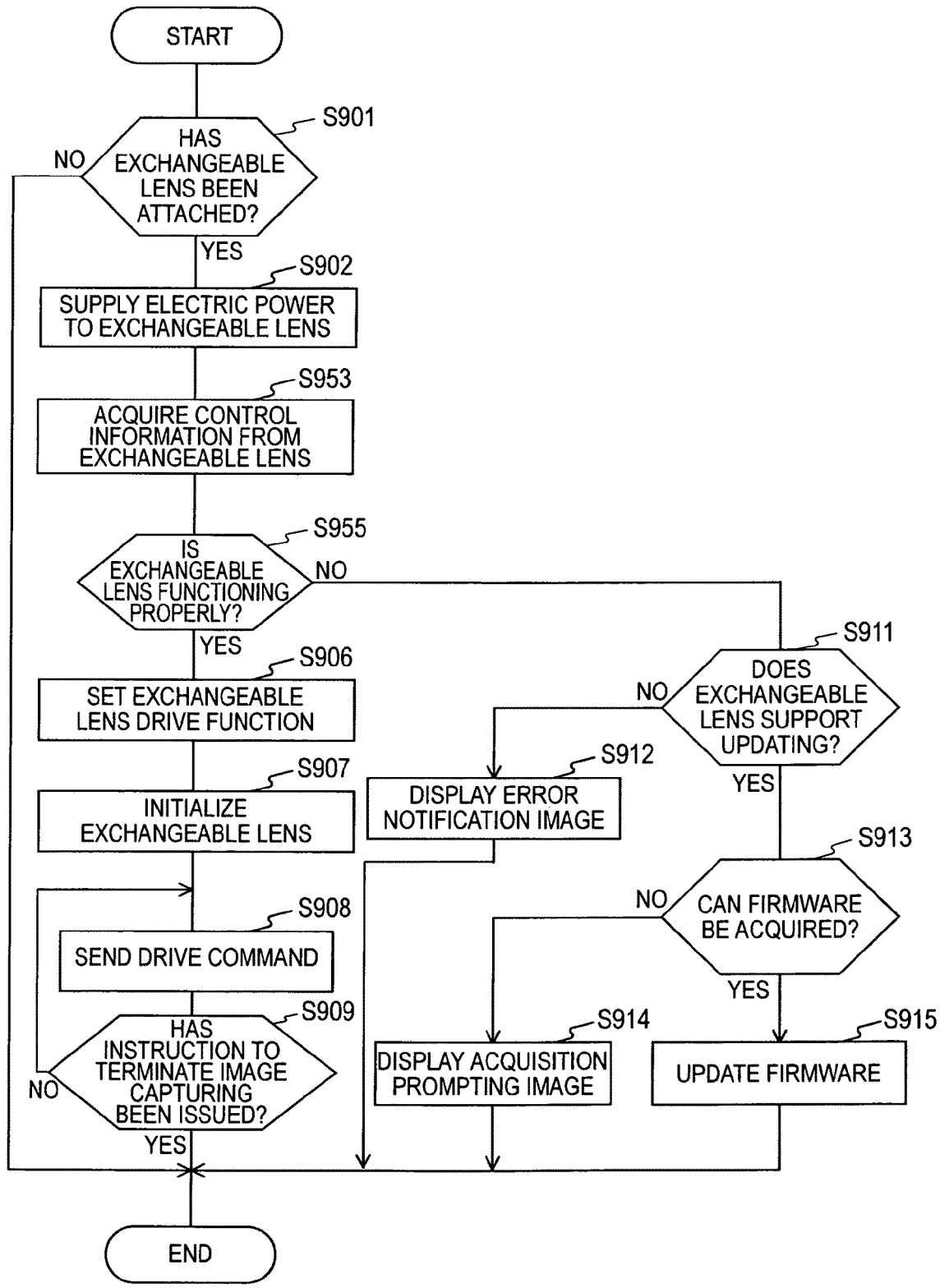

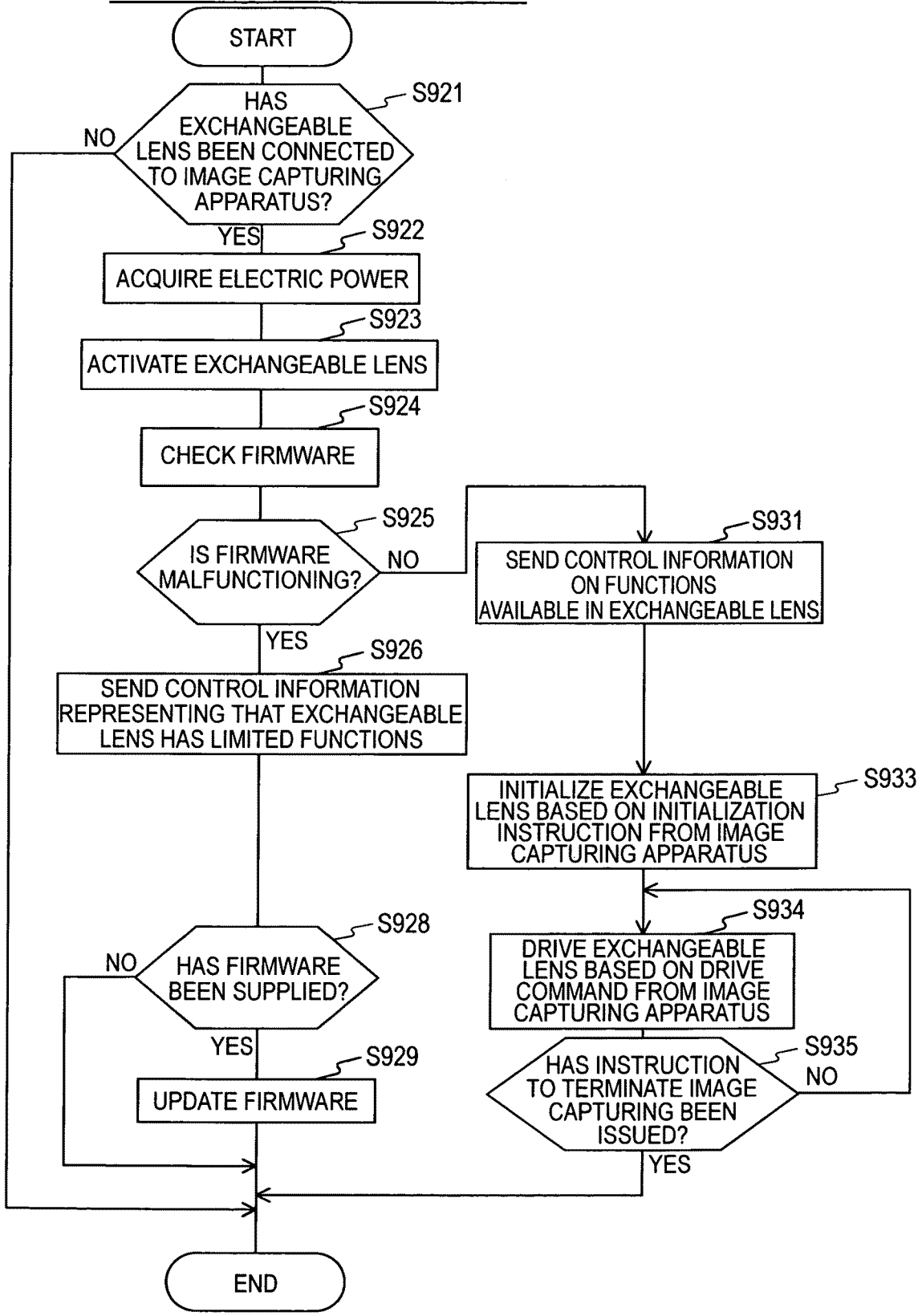

DEVICE, IMAGING APPARATUS, IMAGING SYSTEM, METHOD FOR CONTROLLING DEVICE, AND PROGRAM

BACKGROUND OF THE INVENTION

1. Field of the Invention

The present invention relates to a device, particularly to a device in which a program for controlling actions thereof is installed, an imaging apparatus, an imaging system, a method for controlling the device, and a program that instructs a computer to carry out the method.

2. Description of the Related Art

In recent years, digital still cameras and other imaging apparatus that capture an image of a person or any other subject to produce a captured image and records the produced captured image have been widely used. As an imaging apparatus of this type, an imaging system including a lens unit that can be exchanged (exchangeable lens) depending on applications (digital single lens reflex camera, for example) has been widely used.

For example, an imaging system in which an imaging apparatus (camera body) can control each function of the exchangeable lens has been widely used. On the other hand, a multifunction (complicated) exchangeable lens has been recently introduced. As an exchangeable lens has more functions, the imaging apparatus controls the exchangeable lens more frequently, and malfunctions (errors) more probably occur when the imaging apparatus controls the exchangeable lens.

As an imaging apparatus that can resolve malfunctions, for example, there has been a proposed imaging apparatus that detects an error, if any, when communicating with the exchangeable lens and displays a what-to-do message to present a user with an appropriate way to resolve the error (see JP-A-2009-260949 (FIG. 1), for example).

SUMMARY OF THE INVENTION

In the technology of the related art described above, the imaging apparatus checks data communicated between the imaging apparatus and the exchangeable lens to detect a communication error, if any, and take an appropriate action to resolve the error.

The imaging apparatus described above, however, does not detect all malfunctions that occur when the imaging apparatus controls the exchangeable lens, that is, those other than communication errors (malfunctions associated with a program held in the exchangeable lens, for example). It is therefore important to appropriately resolve malfunctions other than communication errors.

Thus, it is desirable to appropriately resolve malfunctions associated with a program held in a device.

According to an embodiment of the invention, there is provided a device, a method for controlling the device, and a program that instructs a computer to carry out the method, the device including an interface for performing communication with an apparatus to which the device is connected, and a supplying section that supplies support information, for notifying functions supported and controlled by the apparatus based on a detection result provided from the detecting section that detects a malfunction associated with a program held in a holding section, to the apparatus. The configuration described above provides the following advantage: Based on a detected malfunction associated with the program held in the device, support information for notifying functions supported and controlled by the apparatus is produced, and the produced support information is supplied to the apparatus.

In this embodiment, the support information produced by the supplying section may include function availability information representing on a function basis whether or not the functions supported and controlled by the apparatus are available based on the detection result provided from the detecting section. The configuration described above provides the following advantage: The produced support information includes function availability information representing on a function basis whether or not the functions supported and controlled by the apparatus are available. In this case, when the detecting section has detected a malfunction, the supplying section may produce the support information in such a way that the function availability information on the function that does not function properly due to the detected malfunction represents that the apparatus does not support or control the function. The configuration described above provides the following advantage: When a malfunction associated with the program has been detected, support information is so produced that the function availability information on the function that does not function properly due to the detected malfunction represents that the apparatus does not support or control the function.

In this embodiment, when the detecting section has detected no malfunction, the supplying section may produce the support information in such a way that all functions available in the device and supported and controlled by the apparatus are notified. The configuration described above provides the following advantage: When no malfunction associated with the program has been detected, the support information is so produced that all functions available in the device and supported and controlled by the apparatus are notified.

In this embodiment, the device may further include a notifying section that notifies whether or not the program is malfunctioning based on the detection result provided from the detecting section. The configuration described above provides the following advantage: Whether or not the program is malfunctioning is notified based on the detection result provided from the detecting section. In this case, the device may further include an update section that updates the program held in the holding section, when the notifying section has notified the apparatus that the program has the malfunction, by using a new version of the program supplied from the apparatus in response to the notification. The configuration described above provides the following advantage: When the notifying section has notified the apparatus that the program is malfunctioning, the program held in the holding section is updated by using a new program supplied from the apparatus in response to the notification. In this case, the program may be formed of an updatable area where data is rewritten when the update section performs updating and a non-updatable area where data is not rewritten even when the update section performs updating, and the detecting section may detect a malfunction in the updatable area. The configuration described above provides the following advantage: The detecting section detects a malfunction in the updatable area. In this case, the device may be an exchangeable lens attachable to and detachable from the apparatus; the updatable area may store data on actions of a driving section that drives each optical member in the exchangeable lens; the non-updatable area may store data for detecting a malfunction in the exchangeable lens and data for controlling the communication with the apparatus when the malfunction has been detected; and the detecting section may detect a malfunction in the data stored in the updatable area based on the data stored in the non-updatable are. The configuration described above provides the following advantage: The detecting section detects a malfunction in the data stored in the updatable area based on the data stored in the non-updatable area.

In this embodiment, the device may further include an update section that updates the program held in the holding section, when the apparatus has detected that the program has the malfunction based on the support information, by using the new version of the program supplied from the apparatus in response to the detection. The configuration described above provides the following advantage: When the apparatus has detected based on the support information that the program is malfunctioning, the program held in the holding section is updated by using a new program supplied from the apparatus.

In this embodiment, the device may be an exchangeable lens attachable to and detachable from the apparatus. The configuration described above provides the following advantage: Based on a detected malfunction associated with the program held in the exchangeable attachable to and detachable from the apparatus, support information for notifying functions supported and controlled by the apparatus is produced, and the produced support information is supplied to the apparatus.

In this embodiment, the program may be firmware for the device. The configuration described above provides the following advantage: Based on a detected malfunction associated with the firmware, support information for notifying functions supported and controlled by the apparatus is produced, and the produced support information is supplied to the apparatus.

According to another embodiment of the invention, there are provided an apparatus, a method for controlling the apparatus, and a program that instructs a computer to carry out the method, the apparatus including an acquiring section that accesses a device and acquires support information by using which a device notifies functions supported and controlled by the apparatus and malfunction notification information by using which the device notifies whether or not a program held in the device is malfunctioning and a determining section that determines whether or not the program held in the device is updated based on the acquired support information and the acquired malfunction notification information. The configuration described above provides the following advantage: Whether or not the program held in the device is updated is determined based on the support information and the malfunction notification information.

In this embodiment, the determining section may start updating the program when having received the malfunction notification information that notifies that the device is malfunctioning and the support information representing that a function of updating the program is one of the functions supported and controlled by the apparatus. The configuration described above provides the following advantage: When malfunction notification information that notifies that the device is malfunctioning and support information representing that a function of updating the program is one of the functions supported and controlled by the apparatus are supplied, the program starts being updated.

In this embodiment, the apparatus may further include an initialization information supplying section that supplies the device with initialization information for initializing the device when the supplied malfunction notification information notifies that the device is functioning properly, whereas not supplying the device with the initialization information when the supplied malfunction notification information notifies that the device is malfunctioning. The configuration described above provides the following advantage: When malfunction notification information that notifies that the device is functioning properly is supplied, initialization information for initializing the device is supplied to the device, whereas when malfunction notification information that notifies that the device is malfunctioning is supplied, no initialization information is supplied to the device.

According to still another embodiment of the invention, there are provided a device, a method for controlling the device, and a program that instructs a computer to carry out the method, and the device including an interface for performing communication with an apparatus to which the device is connected, a holding section that holds a program for controlling actions of the device, a detecting section that detects a malfunction associated with the program held in the holding section, and a notifying section that produces information for notifying whether or not the program is malfunctioning based on the detection result provided from the detecting section and supplies the produced information to the apparatus. The configuration described above provides the following advantage: Based on a detected malfunction associated with the program held in the device, information for notifying whether or not the program is malfunctioning is produced, and the produced information is supplied to the apparatus.

According to yet another embodiment of the invention, there are provided a system, a method for controlling the system, and a program that instructs a computer to carry out the method, the system including a device including an interface for performing communication with an apparatus to which the device is connected, and a supplying section that supplies support information, for notifying functions supported and controlled by the apparatus based on a detection result provided from a detecting section that detects a malfunction associated with a program held in a holding section, to the apparatus; and an apparatus including an acquiring section that accesses the device and acquires the support information by using which the device notifies the functions supported and controlled by the apparatus and malfunction notification information by using which the device notifies whether or not the program held in the device is malfunctioning and a determining section that determines whether or not the program held in the device is updated based on the acquired support information and the acquired malfunction notification information. The configuration described above provides the following advantage: The apparatus determines whether or not the program held in the device is updated based on the support information and the malfunction notification information produced by the device.

The invention can provide an outstanding advantage of an ability to appropriately resolve a malfunction associated with a program held in a device.

BRIEF DESCRIPTION OF THE DRAWINGS

FIGS. 5A and 5B are conceptual diagrams showing an example of control information supplied from a control information supplying portion in the first embodiment of the invention;

FIG. 7 is a flowchart showing an exemplary exchangeable lens control procedure performed by an imaging apparatus in the first embodiment of the invention;

FIG. 8 is a flowchart showing an exemplary drive procedure performed by an exchangeable lens in the first embodiment of the invention;

FIG. 9 is a block diagram showing an example of the functional configuration of an imaging system in a second embodiment of the invention;

FIG. 10 is a flowchart showing an exemplary exchangeable lens control procedure performed by an imaging apparatus in the second embodiment of the invention;

FIG. 12 is a flowchart showing an exemplary exchangeable lens control procedure performed by an imaging apparatus in the third embodiment of the invention; and FIG. 13 is a flowchart showing an exemplary drive procedure performed by an exchangeable lens in the third embodiment of the invention.

DESCRIPTION OF THE PREFERRED EMBODIMENTS

Modes for carrying out the invention (hereinafter referred to as embodiments) will be described below. The description will be made in the following order.

1. First embodiment (imaging system control: a case where firmware is updated based on malfunction notification information)

2. Second embodiment (imaging system control: a case where malfunction is prevented based on control information)

3. Third embodiment (imaging system control: a case where firmware is updated based on control information)

1. First Embodiment

[Example of Rear-Side External Configuration of Imaging System]

Figure 1:
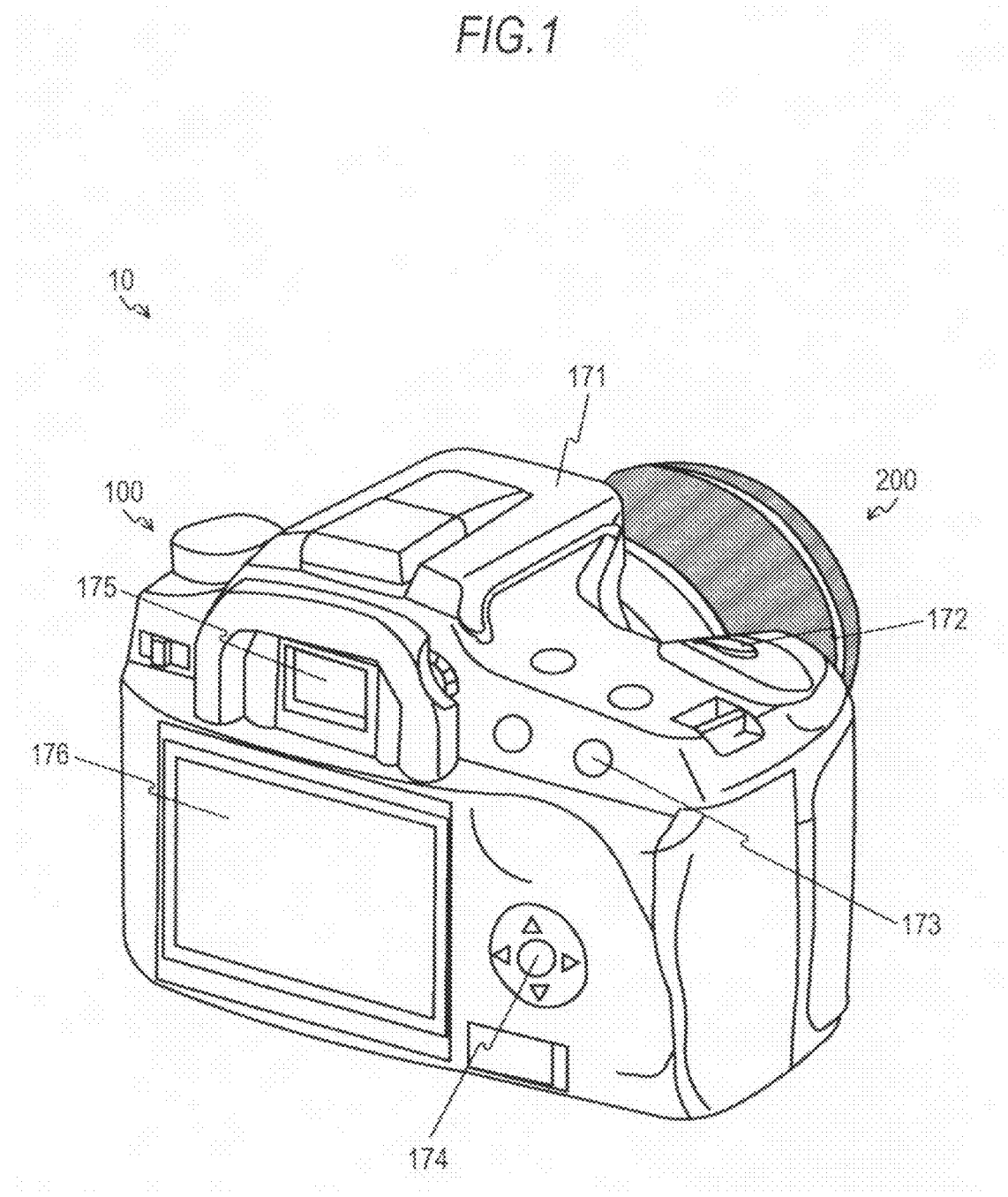
FIG. 1 is a schematic view showing an example of the exterior configuration of an imaging system in a first embodiment of the invention.

FIG. 1 is a schematic view showing an example of the exterior configuration of an imaging system 10 in a first embodiment of the invention. The imaging system 10 includes an imaging apparatus 100 and an exchangeable lens 200.

In the first embodiment of the invention, it is assumed that the imaging apparatus 100 is a camera body of a single lens reflex camera to which an exchangeable lens unit (device) is attached, and that the exchangeable lens 200 is the lens unit to be exchanged.

The imaging apparatus 100 captures an image of a subject to produce image data (digital data) and records the produced image data as image content. The imaging apparatus 100 includes a built-in flashlight 171, a release button 172, operation buttons 173 and 174, a finder 175, and a rear-side liquid crystal display screen 176.

The built-in flashlight 171 makes up for a shortage of brightness by emitting light when an image is captured.

The release button 172 initiates imaging when pressed down by a user.

The operation buttons 173 and 174, which are operated by the user for a variety of operations, for example, setting actions of the imaging apparatus 100.

The finder 175 allows the user to check the position of a subject and the angle of view.

The rear-side liquid crystal display screen 176 allows the user to check a captured image and a variety of settings.

The interior configuration of the imaging system 10 will subsequently be described with reference to FIG. 2.

[Example of Interior Configuration of Imaging System]

Figure 2:
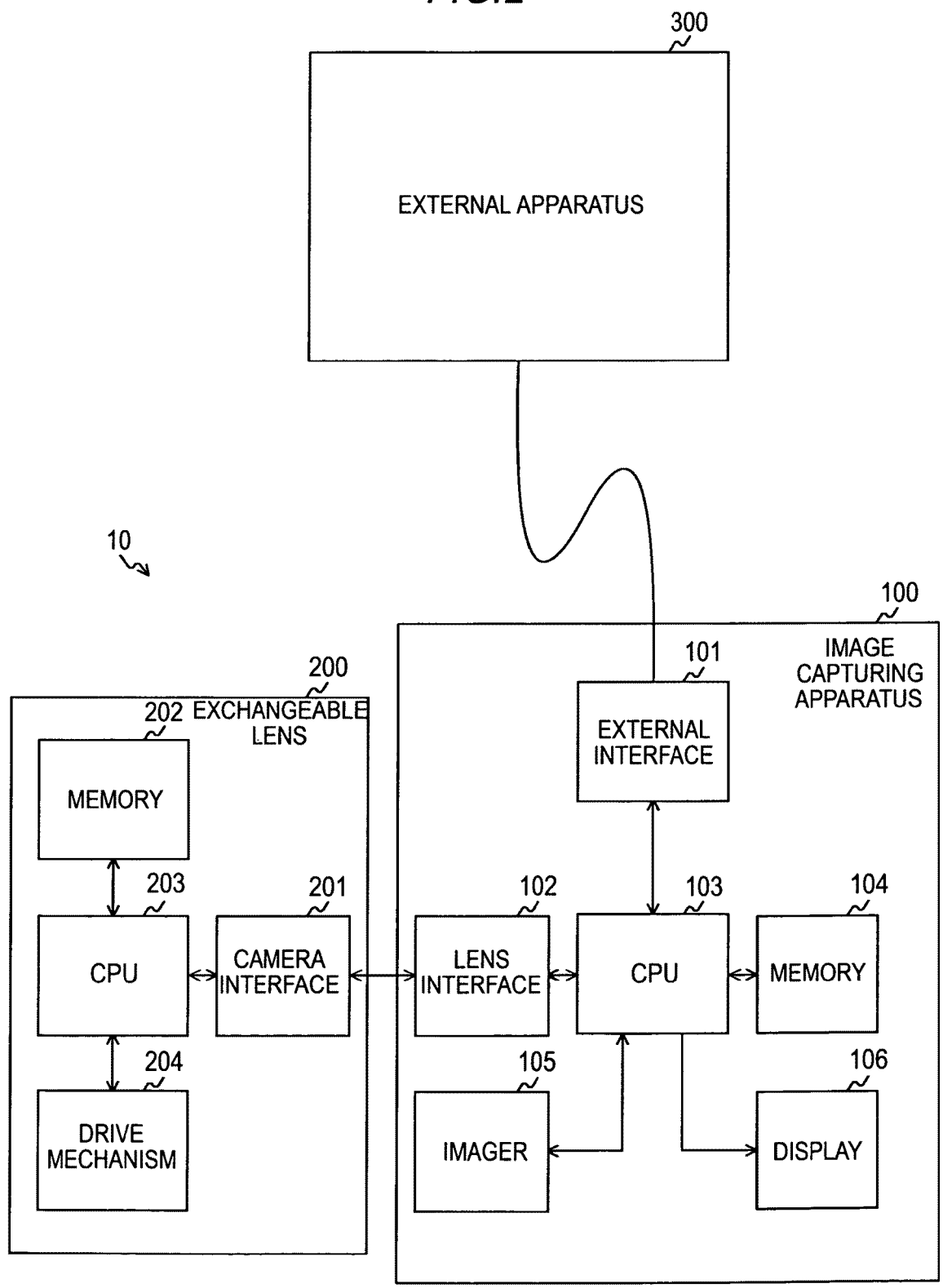
FIG. 2 is a diagram showing an example of the interior configuration of the imaging system in the first embodiment of the invention.

FIG. 2 is a diagram showing an example of the interior configuration of the imaging system 10 in the first embodiment of the invention. FIG. 2 also shows an external apparatus 300 connected to the imaging system 10.

The external apparatus 300, which can be a personal computer or any other suitable information processing apparatus, sends and receives data to and from the imaging apparatus 100. The external apparatus 300, for example, supplies firmware for the exchangeable lens 200 (hereinafter referred to as exchangeable lens firmware) to the imaging apparatus 100.

The imaging apparatus 100 includes an external interface 101, a lens interface 102, a CPU (central processing unit) 103, a memory 104, an imager 105, and a display 106. FIG. 2 describes not only how the imaging apparatus 100 acquires exchangeable lens firmware from the external apparatus 300 and supplies the acquired exchangeable lens firmware to the exchangeable lens 200 but also the configuration of each of the components in the imaging apparatus 100.

The external interface 101 includes a USB (universal serial bus) or other type of input/output terminal and connects the imaging apparatus 100 to the external apparatus 300. The external interface 101 supplies the exchangeable lens firmware acquired from the external apparatus 300 to the CPU 103.

The lens interface 102 connects the imaging apparatus 100 to the exchangeable lens 200. For example, the lens interface 102 receives information on the exchangeable lens 200 supplied therefrom and supplies the received information to the CPU 103. When the exchangeable lens firmware is updated, the lens interface 102 supplies new exchangeable lens firmware to the exchangeable lens 200 in the update process, in which the new firmware is written.

The CPU 103 controls the entire imaging apparatus 100. For example, to supply exchangeable lens firmware to the exchangeable lens 200, the CPU 103 first controls relevant components in the imaging apparatus 100 so that exchangeable lens firmware is acquired from the external apparatus 300 connected to the imaging apparatus 100. The CPU 103 then controls relevant components in the imaging apparatus 100 so that the acquired exchangeable lens firmware is supplied to the exchangeable lens 200.

The memory 104, which is formed of a non-volatile memory, records a program and other information for controlling the imaging apparatus 100.

The imager 105 converts light incident from a subject into an electric signal in a photo-electric conversion process to produce an image signal.

The display 106, which is formed of a color liquid crystal panel or any other similar component, displays an image. For example, the display 106 displays a notice screen or other information when the exchangeable lens firmware is updated.

The exchangeable lens 200 includes a camera interface 201, a memory 202, a CPU 203, and a drive mechanism 204. FIG. 2 describes not only how exchangeable lens firmware held in the memory 202 is updated to new exchangeable lens firmware supplied for the update purpose from the imaging apparatus 100 but also the configuration of each of the components in the exchangeable lens 200.

The camera interface 201 connects the exchangeable lens 200 to the imaging apparatus 100. For example, the camera interface 201 supplies information on the exchangeable lens 200 to the imaging apparatus 100 and acquires exchangeable lens firmware from the imaging apparatus 100.

The memory 202, which is formed of a non-volatile memory, records a program for controlling the exchangeable lens 200, such as exchangeable lens firmware.

The CPU 203 controls the entire exchangeable lens 200. For example, to update the exchangeable lens firmware in the memory 202, the CPU 203 first controls relevant components in the exchangeable lens 200 so that the exchangeable lens 200 receives exchangeable lens firmware from the imaging apparatus 100. The CPU 203 then controls relevant components in the exchangeable lens 200 so that the received exchangeable lens firmware is written in the memory 202.

The drive mechanism 204 produces a drive force for driving each optical member to be driven in the exchangeable lens 200.

Functional configurations of the imaging system 10 and the external apparatus 300 will subsequently be described with reference to FIG. 3.

[Example of Functional Configuration of Imaging System]

Figure 3:
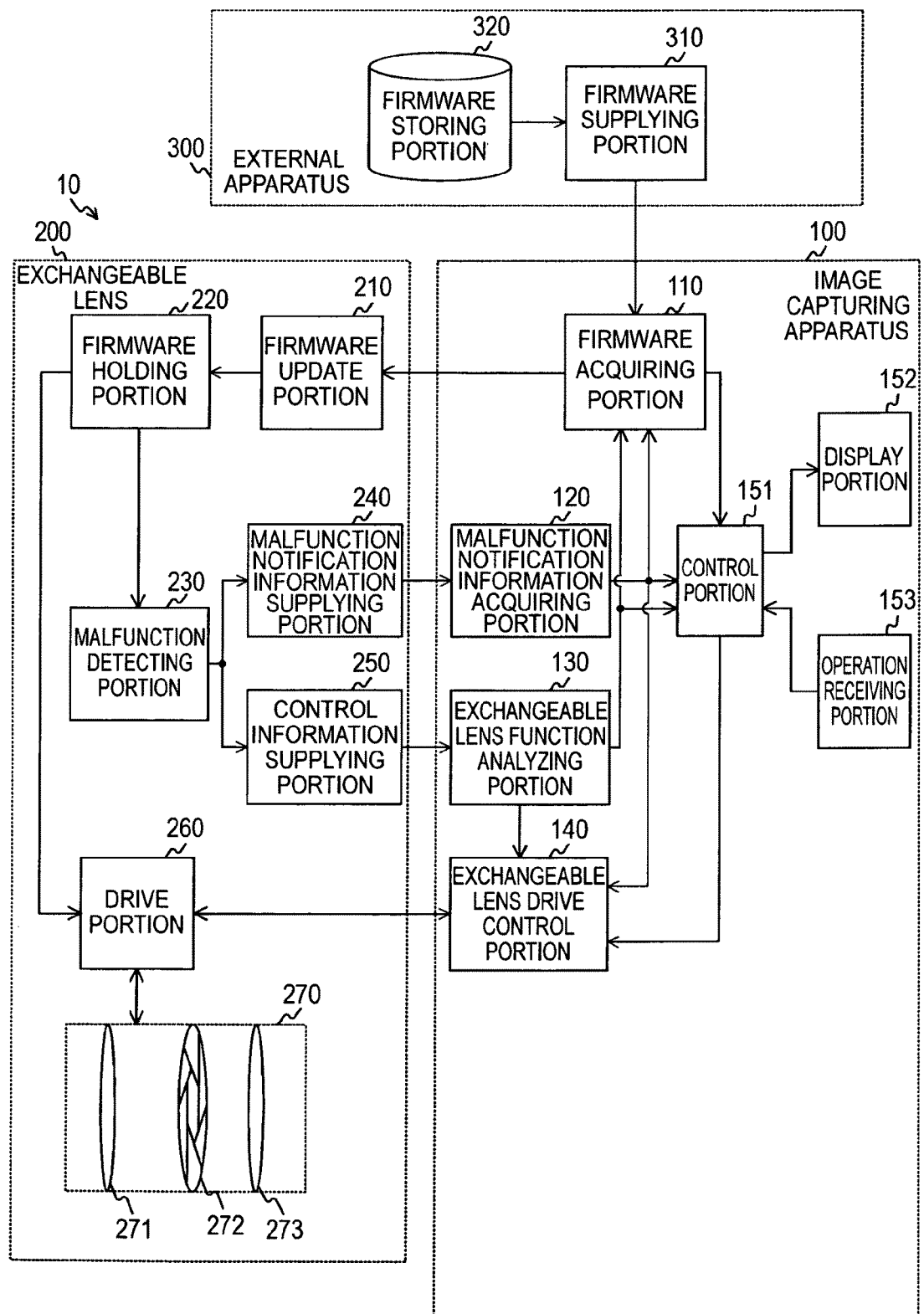
FIG. 3 is a block diagram showing an example of the functional configuration of the imaging system in the first embodiment of the invention.

FIG. 3 is a block diagram showing an example of the functional configuration of the imaging system 10 in the first embodiment of the invention.

The imaging apparatus 100 includes a firmware acquiring portion 110, a malfunction notification information acquiring portion 120, an exchangeable lens function analyzing portion 130, an exchangeable lens drive control portion 140, a control portion 151, a display portion 152, and an operation receiving portion 153.

The exchangeable lens 200 includes a firmware update portion 210, a firmware holding portion 220, a malfunction detecting portion 230, a malfunction notification information supplying portion 240, a control information supplying portion 250, a drive portion 260, and a lens barrel 270. The lens barrel 270 accommodates a zoom lens 271, a diaphragm 272, and a focus lens 273.

The external apparatus 300 includes a firmware supplying portion 310 and a firmware storing portion 320.

A description will first be made of the functional configuration of the exchangeable lens 200.

The firmware update portion 210 updates exchangeable lens firmware held in the firmware holding portion 220. The firmware update portion 210, when it receives exchangeable lens firmware supplied from the firmware acquiring portion 110, updates the exchangeable lens firmware held in the firmware holding portion 220 to the supplied exchangeable lens firmware. The firmware update portion 210 is an example of an update section set forth in the claims.

The firmware holding portion 220 holds exchangeable lens firmware, which is a set of programs for controlling actions of the exchangeable lens 200. When the exchangeable lens 200 is energized and activated, the firmware holding portion 220 supplies the exchangeable lens firmware held therein to the malfunction detecting portion 230. The firmware holding portion 220 selects a program for driving and controlling the drive portion 260 from the programs that form the exchangeable lens firmware and supplies the selected program to the drive portion 260. An example of the exchangeable lens firmware held in the firmware holding portion 220 will be described with reference to FIG. 4. The firmware holding portion 220 corresponds to the memory 202 shown in FIG. 2 and is an example of a holding section set forth in the claims.

The malfunction detecting portion 230 detects whether or not the exchangeable lens firmware held in the exchangeable lens 200 is malfunctioning. For example, the malfunction detecting portion 230 detects whether or not the exchangeable lens firmware is malfunctioning based on a checksum result or start/end marks (result of checking a start address and an end address). The malfunction detecting portion 230 supplies the detection result representing whether or not a malfunction has detected to the malfunction notification information supplying portion 240 and the control information supplying portion 250. The detection result is referred to as malfunction detection result information. The malfunction detecting portion 230 corresponds to the CPU 203 shown in FIG. 2 and is an example of a detecting section set forth in the claims.

The malfunction notification information supplying portion 240 produces information for notifying whether or not the exchangeable lens firmware is malfunctioning (malfunction notification information) based on the malfunction detection result information supplied from the malfunction detecting portion 230 and supplies the produced malfunction notification information to the imaging apparatus 100. The malfunction notification information supplying portion 240, when it receives malfunction detection result information representing that the exchangeable lens firmware is malfunctioning, supplies malfunction notification information representing that the exchangeable lens firmware is malfunctioning to the malfunction notification information acquiring portion 120. On the other hand, the malfunction notification information supplying portion 240, when it receives malfunction detection result information representing that the exchangeable lens firmware is functioning properly, supplies malfunction notification information representing that the exchangeable lens firmware is functioning properly to the malfunction notification information acquiring portion 120. The malfunction notification information supplying portion 240 is an example of a notifying section set forth in the claims.

The control information supplying portion 250 supplies control information to the imaging apparatus 100 based on the malfunction detection result information supplied from the malfunction detecting portion 230. The control information used herein is information for notifying the imaging apparatus 100 from the exchangeable lens 200 of the functions of the exchangeable lens that are supported and controlled by the imaging apparatus 100 (functions available in exchangeable lens 200). The control information supplying portion 250, when it receives malfunction detection result information representing that the exchangeable lens firmware is functioning properly, supplies control information representing the functions available in the exchangeable lens 200 to the exchangeable lens function analyzing portion 130. On the other hand, the control information supplying portion 250, when it receives malfunction detection result information representing that the exchangeable lens firmware is malfunctioning, disables the malfunctioning function due to the malfunction and supplies control information representing that the exchangeable lens 200 has limited functions to the exchangeable lens function analyzing portion 130. The control information supplying portion 250 is an example of a supplying section set forth in the claims. The control information is an example of support information set forth in the claims.

Consider now, as an example, a case where the exchangeable lens 200 having a focus control function, a diaphragm control function, a zoom control function, and an update function is connected to the imaging apparatus 100. In this example, the control information supplying portion 250, when it receives malfunction detection result information representing that the exchangeable lens firmware is functioning properly, supplies control information representing on a function basis that the focus control function, the diaphragm control function, the zoom control function, and the update function are available. On the other hand, in this example, the control information supplying portion 250, when it receives malfunction detection result information representing that the exchangeable lens firmware is malfunctioning, supplies control information representing on a function basis that none of the focus control function, the diaphragm control function, and the zoom control function is available. The control information supplied from the control information supplying portion 250 will be described with reference to FIGS. 5A and 5B. The control information supplying portion 250 corresponds to the CPU 203 shown in FIG. 2.

The drive portion 260 drives the zoom lens 271, the diaphragm 272, and the focus lens 273 based on a drive signal supplied from the exchangeable lens drive control portion 140 and a control program supplied from the firmware holding portion 220. The drive signal used herein is information by using which the imaging apparatus 100 controls actions of the drive portion 260. For example, when the user desires to drive the focus lens 273 through the imaging apparatus 100, the imaging apparatus 100 supplies a drive signal representing the travel (the amount of movement) of the focus lens 273. The drive portion 260 corresponds to the drive mechanism 204 shown in FIG. 2.

The lens barrel 270 is where the lenses and the diaphragm are accommodated in the exchangeable lens 200.

The zoom lens 271 moves in the lens barrel 270 in the optical axis direction so that the focal distance is changed and hence the magnification of a captured image of a subject is adjusted.

The diaphragm 272 is a light blocker for adjusting the amount of light incident from a subject on the imaging apparatus 100.

The focus lens 273 moves in the lens barrel 270 in the optical axis direction so that the focus is adjusted.

The functional configuration of the imaging apparatus 100 will next be described.

The malfunction notification information acquiring portion 120 acquires malfunction notification information supplied from the malfunction notification information supplying portion 240. The malfunction notification information acquiring portion 120 supplies the acquired malfunction notification information to the firmware acquiring portion 110, the exchangeable lens drive control portion 140, and the control portion 151. The malfunction notification information acquiring portion 120 corresponds to the lens interface 102 shown in FIG. 2.

The exchangeable lens function analyzing portion 130 analyzes whether or not the functions of the exchangeable lens 200 that are supported and controlled by the imaging apparatus 100 are available based on control information supplied from the control information supplying portion 250. The exchangeable lens function analyzing portion 130 supplies the analysis result representing whether or not the functions described above are available to components in the imaging apparatus 100 that are involved in the actions of the functions. For example, the exchangeable lens function analyzing portion 130, when it founds from the analysis that a function of updating exchangeable lens firmware is available, supplies information representing the analysis result (update function availability information representing that the function is available) to the control portion 151 and the firmware acquiring portion 110. Further, the exchangeable lens function analyzing portion 130, when it founds from the analysis that the exchangeable lens 200 has a function of driving a component controlled by the exchangeable lens drive control portion 140, supplies information representing the analysis result (drive function availability information representing that the function is available) to the exchangeable lens drive control portion 140. That is, what function controlled by the imaging apparatus 100 is available in the exchangeable lens 200 is determined based on control information. The exchangeable lens function analyzing portion 130 corresponds to the CPU 103 shown in FIG. 2. The malfunction notification information acquiring portion 120 and the exchangeable lens function analyzing portion 130 are examples of an acquiring section set forth in the claims.

The firmware acquiring portion 110 acquires firmware from the external apparatus 300 externally connected to the imaging apparatus 100. The firmware acquiring portion 110, when it receives malfunction notification information representing that a malfunction has occurred and update function availability information representing that the update function is available, attempts (starts) to acquire exchangeable lens firmware from the external apparatus 300. The firmware acquiring portion 110, when it has successfully acquired exchangeable lens firmware, supplies the acquired exchangeable lens firmware to the firmware update portion 210. The firmware acquiring portion 110, when it has attempted to acquire exchangeable lens firmware, supplies information representing the result of acquiring exchangeable lens firmware (whether or not exchangeable lens firmware has been successfully acquired) (acquisition result information) to the control portion 151. On the other hand, the firmware acquiring portion 110, when it receives malfunction notification information supplied from the malfunction notification information acquiring portion 120 and representing that the exchangeable lens firmware is functioning properly, does not attempt to acquire exchangeable lens firmware or supply acquisition result information. The firmware acquiring portion 110 corresponds to the external interface 101, the lens interface 102, and the CPU 103 shown in FIG. 2. The firmware acquiring portion 110 is an example of a determining section set forth in the claims.

The exchangeable lens drive control portion 140 supplies the exchangeable lens 200 with information (drive command) for controlling actions of the drive portion 260 in the exchangeable lens 200. Among the exchangeable lens controlling functions available in the exchangeable lens drive control portion 140, the exchangeable lens drive control portion 140 enables only the function supported by the exchangeable lens 200 based on the drive function availability information supplied from the exchangeable lens function analyzing portion 130. The exchangeable lens drive control portion 140 then produces a drive command for the enabled function and supplies the produced drive command to the drive portion 260.

Further, the exchangeable lens drive control portion 140, when it receives malfunction notification information supplied from the malfunction notification information acquiring portion 120 and representing that the exchangeable lens firmware is functioning properly, supplies the drive portion 260 with an initialization instruction to initialize the exchangeable lens 200 by driving the drive portion 260. On the other hand, the exchangeable lens drive control portion 140, when it receives malfunction notification information supplied from the malfunction notification information acquiring portion 120 and representing that the exchangeable lens firmware is malfunctioning, supplies no initialization instruction to the exchangeable lens 200. The exchangeable lens drive control portion 140 also supplies no initialization instruction to the exchangeable lens 200 when the drive function availability information notifies that there is no function to be enabled. The exchangeable lens drive control portion 140 corresponds to the lens interface 102 and the CPU 103 shown in FIG. 2. The exchangeable lens drive control portion 140 is an example of an initialization information supplying section set forth in the claims.

The control portion 151 controls actions of each of the components in the imaging apparatus 100. As an example, consider a case where the user issues an instruction to change the magnification of an image of a subject by operating the operation receiving portion 153. In this case, the control portion 151 calculates the distance over which the zoom lens 271 needs to move in order to change the magnification of the image and supplies the calculation result to the exchangeable lens drive control portion 140.

The control portion 151 further instructs the display portion 152 to display notification about exchangeable lens firmware update based on the malfunction notification information, the acquisition result information, and the update function availability information. The notification about the update will be described with reference to FIGS. 6A to 6C. The control portion 151 corresponds to the CPU 103 shown in FIG. 2.

The display portion 152 displays an image. The display portion 152 can, for example, be formed of a color liquid crystal panel. The display portion 152 displays a variety of images, such as a captured image, a recorded image, a setting screen, a live-view image, and an image that notifies exchangeable lens firmware update (notification image). The display portion 152 corresponds to the display 106 shown in FIG. 2.

The operation receiving portion 153 receives user's operation. The operation receiving portion 153 supplies a signal according to the user's operation to the control portion 151.

The functional configuration of the external apparatus 300 will next be described.

The firmware supplying portion 310 supplies exchangeable lens firmware stored in the firmware storing portion 320 to the imaging apparatus 100.

The firmware storing portion 320 stores firmware for the exchangeable lens 200. For example, when firmware is acquired over the Internet, the firmware storing portion 320 serves as a memory that temporarily holds the firmware acquired over the Internet before the acquired firmware is supplied to the exchangeable lens 200. The firmware storing portion 320 supplies exchangeable lens firmware to the firmware supplying portion 310.

As described above, providing the malfunction detecting portion 230, the malfunction notification information supplying portion 240, and the control information supplying portion 250 allows the exchangeable lens 200 to check the firmware therefor and notify the imaging apparatus 100 of the check result.

In FIG. 3, a description has been made of the case where exchangeable lens firmware is acquired from the external apparatus 300 but not necessarily therefrom. For example, exchangeable lens firmware may be held in advance in a flash memory or any other suitable memory in the imaging apparatus 100, and the firmware acquiring portion 110 may acquire the exchangeable lens firmware held in the imaging apparatus 100.

[Example of Exchangeable Lens Firmware]

Figure 4:
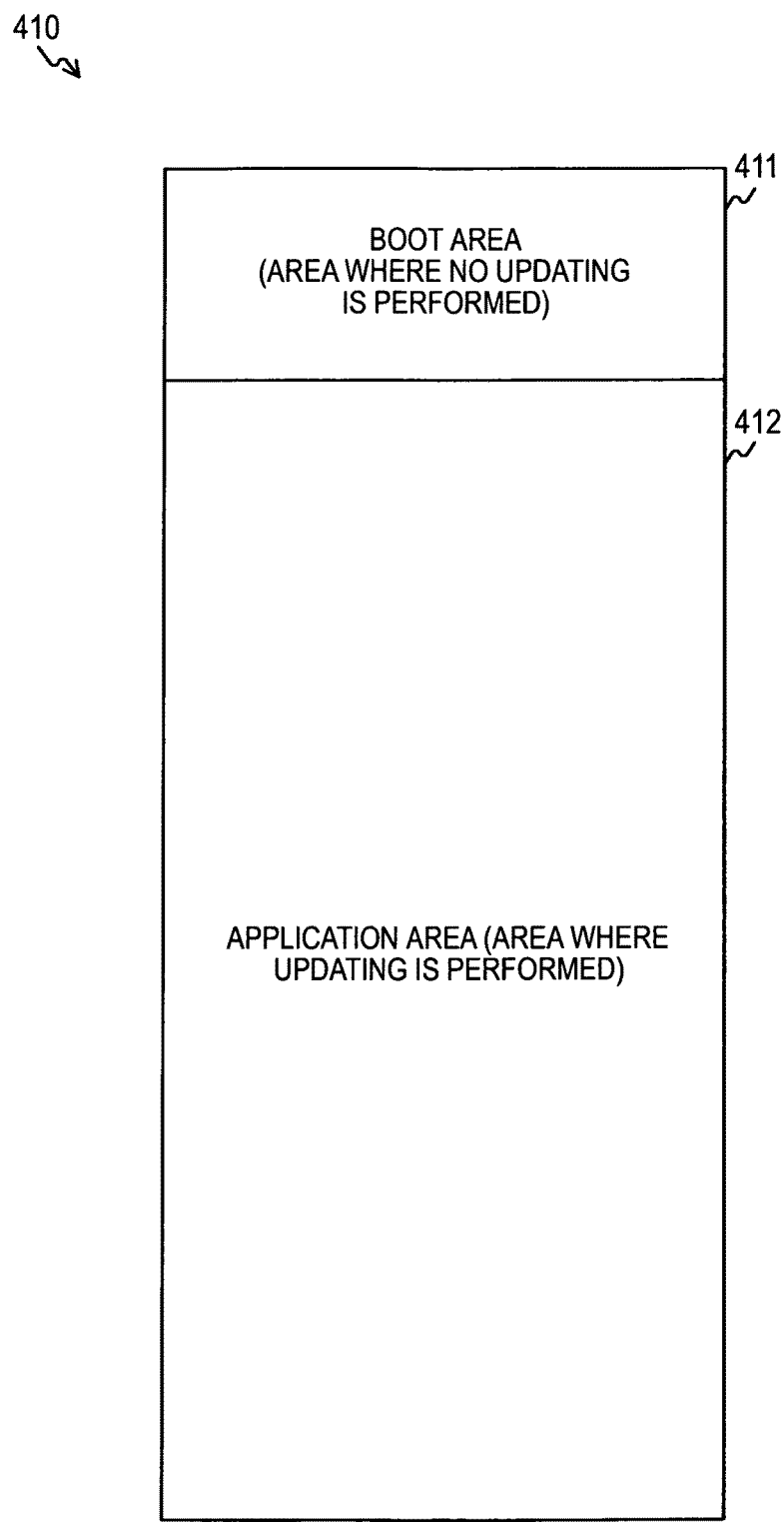
FIG. 4 is a conceptual diagram showing an example of exchangeable lens firmware held in a firmware holding portion in the first embodiment of the invention.

FIG. 4 is a conceptual diagram showing an example of the exchangeable lens firmware held in the firmware holding portion 220 in the first embodiment of the invention.

FIG. 4 shows firmware 410, which diagrammatically illustrates exchangeable lens firmware. The firmware 410 is formed of a boot area 411 and an application area 412.

The boot area 411 stores programs that are not updated. For example, the boot area 411 stores programs for malfunction detection, updating, and communication. Since the boot area 411 is an area where no updating is performed, the programs stored in this area remain intact even when the exchangeable lens firmware has not been successfully updated. That is, malfunction detection, updating, and communication are performed normally in the exchangeable lens 200 even when the exchangeable lens firmware has not been successfully updated and hence malfunctions. The boot area 411 is an example of a non-updatable area set forth in the claims.

The application area 412 stores programs that can be updated. The application area 412 stores, for example, a program for driving the focus lens, a program for driving the diaphragm, and a program for driving the zoom lens. Since the application area 412 is an area where updating can be performed, the programs stored in this area will malfunction and will not work properly when the exchangeable lens firmware has not been successfully updated. That is, the malfunction detecting portion 230 detects whether or not the exchangeable lens firmware is malfunctioning through detection of any malfunction in the application area 412. The application area 412 is an example of an updatable area set forth in the claims.

As described above, the programs for malfunction detection, updating, and communication are stored in the boot area 411, where no updating is performed. Therefore, even when the exchangeable lens firmware has not been successfully updated, the exchangeable lens can detects that the exchangeable lens firmware is malfunctioning, notify the imaging apparatus 100 of the detected malfunction, and perform updating again.

[Example of Control Information]

FIGS. 5A and 5B are conceptual diagrams showing an example of the control information supplied from the control information supplying portion 250 in the first embodiment of the invention.

In FIGS. 5A and 5B, the exchangeable lens 200 is assumed to have a focus lens driving function, a zoom lens driving function, a diaphragm driving function, and a firmware updating function as the functions of the exchangeable lens 200 that are controlled by the imaging apparatus 100. The exchangeable lens 200 is also assumed not to have a hand-shake correcting function.

FIG. 5A diagrammatically shows control information 420 supplied from the control information supplying portion 250 when the malfunction detecting portion 230 detects that the exchangeable lens firmware is functioning properly. The control information 420 has an area labeled as control functions 421 where the functions of the exchangeable lens that are controlled by the imaging apparatus 100 are listed. The control information 420 further has an area labeled as function availability information 422 where control information supplied from the control information supplying portion 250 is listed in the form of availability of the functions listed in the control functions 421. The function availability information 422 is expressed by either "available" representing that the function shown in the corresponding field of the control functions 421 is available or "not available" representing that the function shown in the corresponding field of the control functions 421 is not available.

Control information created when the exchangeable lens firmware is functioning properly will be described with reference to FIG. 5A.

The control information supplying portion 250, when it receives malfunction detection result information representing that the exchangeable lens firmware is functioning properly, supplies the exchangeable lens function analyzing portion 130 with control information representing the functions available in the exchangeable lens 200. That is, control information representing that the focus lens driving function, the zoom lens driving function, the diaphragm driving function, and the firmware updating function are available is supplied to the exchangeable lens function analyzing portion 130.

FIG. 5B diagrammatically shows control information 430 supplied from the control information supplying portion 250 when the malfunction detecting portion 230 detects that the exchangeable lens firmware is malfunctioning. The control information 430 has areas labeled with control functions 431 and function availability information 432, as in FIG. 5A.

Control information created when the exchangeable lens firmware is malfunctioning will be described with reference to FIG. 5B.

The control information supplying portion 250, when it receives malfunction detection result information representing that the exchangeable lens firmware is malfunctioning, supplies the exchangeable lens function analyzing portion 130 with control information representing that the exchangeable lens 200 has limited functions. That is, control information 430 representing that the focus lens driving function, the zoom lens driving function, and the diaphragm driving function, which are normally available in the exchangeable lens 200, are disabled (not available) is supplied to the exchangeable lens function analyzing portion 130, as shown in FIG. 5B.

As described above, the control information supplying portion 250 supplies the exchangeable lens function analyzing portion 130 with control information according to the state of the exchangeable lens firmware. In this way, when the exchangeable lens firmware is malfunctioning, the imaging apparatus 100 can be notified of a function that will not function properly due to the malfunction as an unavailable function in the exchangeable lens 200. In response to the notification, the imaging apparatus 100 will not control the function that will not function properly due to the malfunction, whereby inappropriate operation of the exchangeable lens 200 can be prevented.

[Example of Display Screen]

Figure 6A:
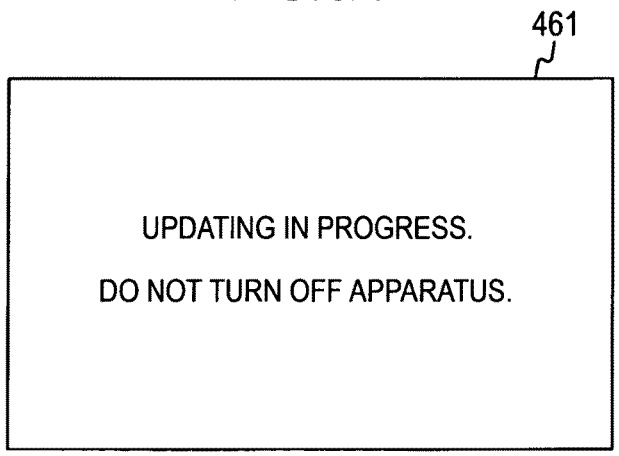
FIGS. 6A to 6C are conceptual diagrams showing exemplary display screens displayed on a display portion when a malfunction associated with the exchangeable lens firmware is detected in the first embodiment of the invention.
Figure 6B:
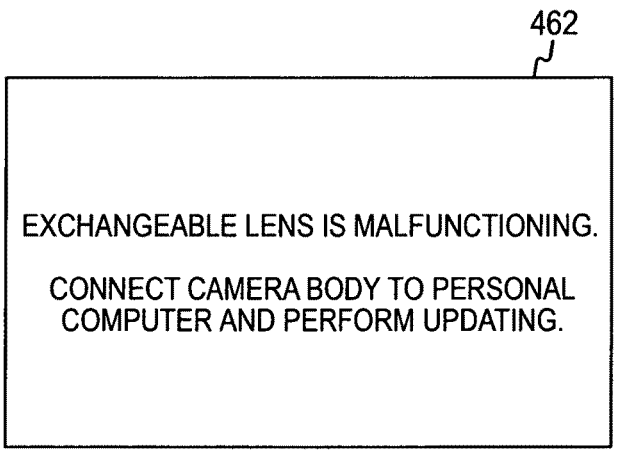
Figure 6C:
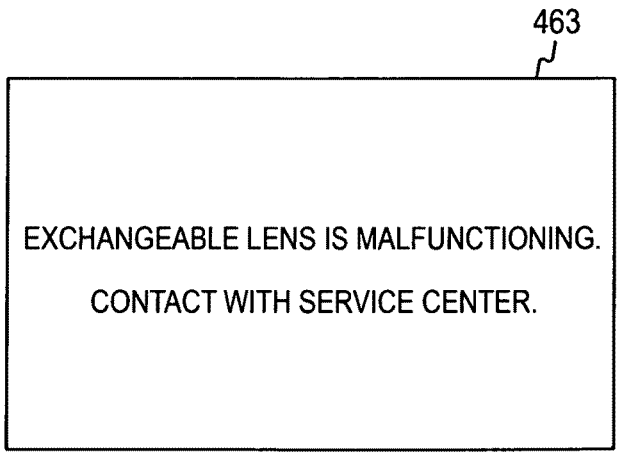

FIGS. 6A to 6C are conceptual diagrams showing exemplary display screens that the display portion 152 displays when a malfunction associated with the exchangeable lens firmware is detected in the first embodiment of the invention.

FIG. 6A shows an image that the display portion 152 displays (displayed image 461) when the exchangeable lens firmware can be updated to new exchangeable lens firmware acquired from the external apparatus 300. The display portion 152 displays the displayed image 461 when the control portion 151 receives malfunction notification information representing that the exchangeable lens firmware is malfunctioning, acquisition result information representing that new exchangeable lens firmware has been successfully acquired, and update function availability information representing that the update function is available. The displayed image 461 displays a message that notifies the user that the imaging apparatus should not be turned off because the exchangeable lens firmware is being updated.

FIG. 6B shows an image that the display portion 152 displays (displayed image 462) when no updating can be performed because no exchangeable lens firmware can be acquired from the external apparatus 300. The display portion 152 displays the displayed image 462 when the control portion 151 receives malfunction notification information representing that the exchangeable lens firmware is malfunctioning, acquisition result information representing that no exchangeable lens firmware has been successfully acquired, and update function availability information representing that the update function is available. Since no exchangeable lens firmware can be acquired from the external apparatus 300, the displayed image 462 displays a message that prompts the user to connect the imaging apparatus 100 to the external apparatus 300.

FIG. 6C shows an image that the display portion 152 displays (displayed image 463) when a malfunction associated with the exchangeable lens 200 in which the exchangeable lens firmware updating function is unavailable is detected. The display portion 152 displays the displayed image 463 when the control portion 151 receives malfunction notification information representing that the exchangeable lens firmware is malfunctioning and update function availability information representing that no update function is available. Since the exchangeable lens 200 has no exchangeable lens firmware updating function, the displayed image 463 displays a message that recommends the user to contact with a service center.

As described above, when the exchangeable lens 200 supplies malfunction notification information representing that the exchangeable lens firmware is malfunctioning, the imaging apparatus 100 can start updating the exchangeable lens firmware. When new exchangeable lens firmware used in the updating can be prepared, the imaging apparatus 100 automatically updates the exchangeable lens firmware held in the exchangeable lens 200.

[Example of Actions of Imaging System]

Actions of the imaging system 10 in the first embodiment of the invention will next be described with reference to the drawings.

FIG. 7 is a flowchart showing an exemplary exchangeable lens control procedure performed by the imaging apparatus 100 in the first embodiment of the invention.

It is first judged whether or not the exchangeable lens 200 has been attached (step S901). When the judgment result (step S901) shows that the exchangeable lens 200 has not been attached, the exchangeable lens control procedure is terminated.

On the other hand, when the judgment result (step S901) shows that the exchangeable lens 200 has been attached, the imaging apparatus 100 starts supplying electric power to the exchangeable lens 200 (step S902). The exchangeable lens function analyzing portion 130 subsequently acquires control information supplied from the exchangeable lens 200 (step S903). Further, the malfunction notification information acquiring portion 120 acquires malfunction notification information supplied from the exchangeable lens 200 (step S904).

It is next judged based on the malfunction notification information whether or not the firmware for the exchangeable lens 200 (exchangeable lens firmware) is functioning properly (step S905). When the judgment result (step S905) shows that the exchangeable lens firmware is functioning properly, what function driven by the exchangeable lens drive control portion 140 (exchangeable lens drive function) is available in the exchangeable lens 200 is determined (step S906). The determination is made based on the result of analyzing the control information provided from the exchangeable lens function analyzing portion 130.

The exchangeable lens drive control portion 140 then supplies an initialization instruction to the exchangeable lens 200 to initialize the exchangeable lens 200 (step S907). The exchangeable lens drive control portion 140 then sends a drive command to drive the exchangeable lens 200 (step S908). The control portion 151 then judges whether or not an instruction to terminate imaging has been issued (step S909). When the judgment result (step S909) shows that no instruction to terminate imaging has been issued, the control returns to step S908 and the exchangeable lens 200 continues to be driven.

On the other hand, when the judgment result (step S909) shows that an instruction to terminate imaging has been issued, the exchangeable lens control procedure is terminated.

When the judgment result (step S905) shows that the exchangeable lens 200 is not functioning properly (is malfunctioning), it is judged whether or not the exchangeable lens 200 supports firmware updating (step S911). When the judgment result (step S911) shows that the exchangeable lens 200 does not support firmware updating, the display portion 152 displays an error notification image (displayed image 463 shown in FIG. 6C, for example) (step S912). After the display portion 152 displays the error notification image, the exchangeable lens control procedure is terminated.

On the other hand, when the judgment result (step S911) shows that the exchangeable lens 200 supports firmware updating, it is judged whether or not exchangeable lens firmware can be acquired from the external apparatus 300 (step S913). When the judgment result (step S913) shows that no exchangeable lens firmware can be acquired from the external apparatus 300, the display portion 152 displays an acquisition prompting image that prompts the user to acquire exchangeable lens firmware (displayed image 462 shown in FIG. 6B, for example) (step S914). After the display portion 152 displays the acquisition prompting image, the exchangeable lens control procedure is terminated.

On the other hand, when the judgment result (step S913) shows that exchangeable lens firmware can be acquired from the external apparatus 300, the exchangeable lens firmware is acquired and the firmware in the exchangeable lens 200 is updated (step S915). After the firmware is updated, the exchangeable lens control procedure is terminated.

FIG. 8 is a flowchart showing an exemplary drive procedure performed by the exchangeable lens 200 in the first embodiment of the invention.

It is first judged whether or not the exchangeable lens 200 has been connected to the imaging apparatus 100 (step S921). When the judgment result (step S921) shows that the exchangeable lens 200 has not been connected to the imaging apparatus 100, the drive procedure is terminated.

On the other hand, when the judgment result (step S921) shows that the exchangeable lens 200 has been connected to the imaging apparatus 100, the imaging apparatus 100 starts supplying electric power to the exchangeable lens 200 (step S922). The exchangeable lens 200 is activated by the supplied electric power (step S923).

The malfunction detecting portion 230 subsequently checks the firmware for the exchangeable lens 200 (exchangeable lens firmware), which is stored in the firmware holding portion 220 (step S924). It is then judged whether or not the exchangeable lens firmware is malfunctioning based on the result of the firmware checking (step S925). When the judgment result (step S925) shows that the exchangeable lens firmware is functioning properly, the malfunction notification information supplying portion 240 sends control information representing the functions available in the exchangeable lens 200 (control information 420 shown in FIG. 5A, for example) (step S931). Step 925 is an example of a detecting step set forth in the claims.

The malfunction notification information supplying portion 240 subsequently sends malfunction notification information representing that the exchangeable lens firmware is functioning properly (step S932). The exchangeable lens 200 is then initialized based on an initialization instruction from the imaging apparatus 100 (step S933). The exchangeable lens 200 is then driven based on a drive command from the imaging apparatus 100 (step S934).

The CPU 203 subsequently judges whether or not an instruction to terminate imaging has been issued (step S935). When the judgment result (step S935) shows that no instruction to terminate imaging has been issued, the control returns to step S934 and the exchangeable lens 200 continues to be driven.

On the other hand, when the judgment result (step S935) shows that an instruction to terminate imaging has been issued, the exchangeable lens drive procedure is terminated.

When the judgment result (step S925) shows that the exchangeable lens firmware is malfunctioning, the control information supplying portion 250 sends control information representing that the exchangeable lens 200 has limited functions (control information 430 shown in FIG. 5B, for example) (step S926). The malfunction notification information supplying portion 240 sends malfunction notification information representing that the firmware for the exchangeable lens 200 is malfunctioning (step S927). Steps 926 and 931 are examples of a supplying step set forth in the claims.

The firmware update portion 210 then judges whether or not exchangeable lens firmware has been supplied from the imaging apparatus 100 (step S928). When the judgment result (step S928) shows that no exchangeable lens firmware has been supplied from the imaging apparatus 100, the exchangeable lens drive procedure is terminated.

On the other hand, the judgment result (step S928) shows that exchangeable lens firmware has been supplied from the imaging apparatus 100, the firmware is updated to the exchangeable lens firmware supplied from the imaging apparatus 100 (step S929). After the firmware is updated, the exchangeable lens drive procedure is terminated.

As described above, according to the first embodiment of the invention, the exchangeable lens 200 can notify the imaging apparatus 100 of a malfunction associated with the exchangeable lens firmware. Further, the imaging apparatus 100 can automatically update the exchangeable lens firmware based on the notification of the malfunction associated with the exchangeable lens firmware.

2. Second Embodiment

The first embodiment of the invention has been described with reference to the imaging system 10 including the imaging apparatus 100 having the malfunction notification information acquiring portion 120 that acquires malfunction notification information, which is added to data communicated between the exchangeable lens and the imaging apparatus. Since information other than the malfunction notification information is separately communicated between the exchangeable lens and the imaging apparatus, the exchangeable lens 200 can be attached for use to an imaging apparatus that does not include the malfunction notification information acquiring portion 120.

Further, the control information on the exchangeable lens 200 in the first embodiment of the invention changes in accordance with the state of the firmware for the exchangeable lens 200 (represents that the exchangeable lens 200 has limited functions). On the other hand, the control information is fixed information representing the functions available in the exchangeable lens. That is, when the exchangeable lens 200 is attached to an imaging apparatus that does not include the malfunction notification information acquiring portion 120, limiting the functions of the exchangeable lens 200 can prevent inappropriate operation of the exchangeable lens 200. The description of a second embodiment of the invention will be made of a case where the functions of the exchangeable lens 200, when attached to an imaging apparatus of related art, are limited with reference to FIGS. 9 and 10.

[Example of Functional Configuration of Imaging System]

FIG. 9 is a block diagram showing an example of the functional configuration of an imaging system 11 in the second embodiment of the invention. The imaging system 11 includes an imaging apparatus 500 and an exchangeable lens 200. FIG. 9 also shows an external apparatus 300 along with the imaging system 11. The exchangeable lens 200 and the external apparatus 300 are the same as those shown in FIG. 3. They therefore have the same reference characters and no description thereof will be made.

The imaging apparatus 500 includes a firmware acquiring portion 510, an exchangeable lens function analyzing portion 130, an exchangeable lens drive control portion 140, a control portion 520, a display portion 152, and an operation receiving portion 153. The exchangeable lens function analyzing portion 130, the exchangeable lens drive control portion 140, the display portion 152, and the operation receiving portion 153 are the same as those shown in FIG. 3. They therefore have the same reference characters and no description thereof will be made.

The control portion 520 controls actions of each of the components in the imaging apparatus 500, as in the case of the control portion 151 shown in FIG. 3. When the user operates the operation receiving portion 153 to issue a request to update the exchangeable lens firmware, the control portion 520 supplies the firmware acquiring portion 510 with information for requesting to update the exchangeable lens firmware (update request information).

The firmware acquiring portion 510 acquires firmware from the external apparatus 300 externally connected to the imaging apparatus 500, as in the case of the firmware acquiring portion 110 shown in FIG. 3. The firmware acquiring portion 510, when it receives update function availability information supplied from the exchangeable lens function analyzing portion 130 and representing that an update function is available and update request information supplied from the control portion 520, attempts to acquire exchangeable lens firmware from the external apparatus 300. The firmware acquiring portion 510 then supplies acquisition result information according to the acquisition result to the control portion 520, as in the case of the firmware acquiring portion 110 shown in FIG. 3. On the other hand, the firmware acquiring portion 510, when it receives update function availability information supplied from the exchangeable lens function analyzing portion 130 and representing that no update function is available, does not attempt to acquire exchangeable lens firmware even when update request information is supplied.

As described above, the imaging apparatus 500 is not notified of whether or not the exchangeable lens firmware is malfunctioning. The exchangeable lens firmware is therefore not automatically updated based on a malfunction associated with the exchangeable lens firmware but is updated only in response to a request from the user. When the exchangeable lens firmware is malfunctioning, control information representing that only limited functions is available is supplied, and there is therefore no function to be enabled by the exchangeable lens drive control portion 140. As a result, no initialization instruction or no drive command is supplied to the exchangeable lens 200. That is, in the imaging apparatus 500, when the exchangeable lens firmware is malfunctioning, the exchangeable lens 200 is not driven at all.

[Example of Actions of Imaging System]

Actions of the imaging system 11 in the second embodiment of the invention will next be described with reference to the drawings.

FIG. 10 is a flowchart showing an exemplary exchangeable lens control procedure performed by the imaging apparatus 500 in the second embodiment of the invention. The control procedure is a variation of that shown in FIG. 7 but differs therefrom in that exchangeable lens firmware is not updated based on malfunction notification information. Actions other than that described above are the same as those in FIG. 7. The actions common to those in FIG. 7 therefore have the same reference characters, and a description of the actions will be partly omitted.

When the exchangeable lens function analyzing portion 130 acquires control information supplied from the exchangeable lens 200 (step S903), what function driven by the exchangeable lens drive control portion 140 (exchangeable lens drive function) available in the exchangeable lens 200 is determined based on the control information (step S906). The exchangeable lens drive control portion 140 subsequently judges whether or not any function that can be driven by the imaging apparatus 500 is available in the exchangeable lens 200 based on the determined exchangeable lens drive function (step S941). When the judgment result (step S941) shows that a function that can be driven by the imaging apparatus 500 is available in the exchangeable lens 200, the control proceeds to step S907.

On the other hand, when the judgment result (step S941) shows that no function that can be driven by the imaging apparatus 500 is available in the exchangeable lens 200, the exchangeable lens control procedure is terminated.

As described above, according to the second embodiment of the invention, when the exchangeable lens firmware is malfunctioning, no drive command is sent, whereby malfunction caused by inappropriate operation the exchangeable lens can be prevented. Further, for example, the user may sense the exchangeable lens is malfunctioning when looking at the abnormal action described above and may be prompted to update the exchangeable lens firmware.

3. Third Embodiment

The first embodiment of the invention has been described with reference to the imaging system 10 including the exchangeable lens 200 that produces malfunction notification information. The imaging apparatus 100 in the imaging system 10 automatically attempts to update the exchangeable lens firmware when having detected that the exchangeable lens firmware is malfunction based on the malfunction notification information.

Further, the control information on the exchangeable lens in the first embodiment of the invention changes in accordance with the state of the firmware for the exchangeable lens (represents that the exchangeable lens 200 has limited functions). Alternatively, an imaging system configured in the following manner is conceivable: That is, when control information representing that the exchangeable lens has limited functions is supplied, it is judged that the exchangeable lens firmware is malfunctioning, and the exchangeable lens firmware is automatically updated. A third embodiment of the invention will be described with reference to an imaging system including an exchangeable lens that produces control information representing that the exchangeable lens has limited functions and an imaging apparatus that automatically updates exchangeable lens firmware based on the control information.

[Example of Functional Configuration of Imaging System]

Figure 11:
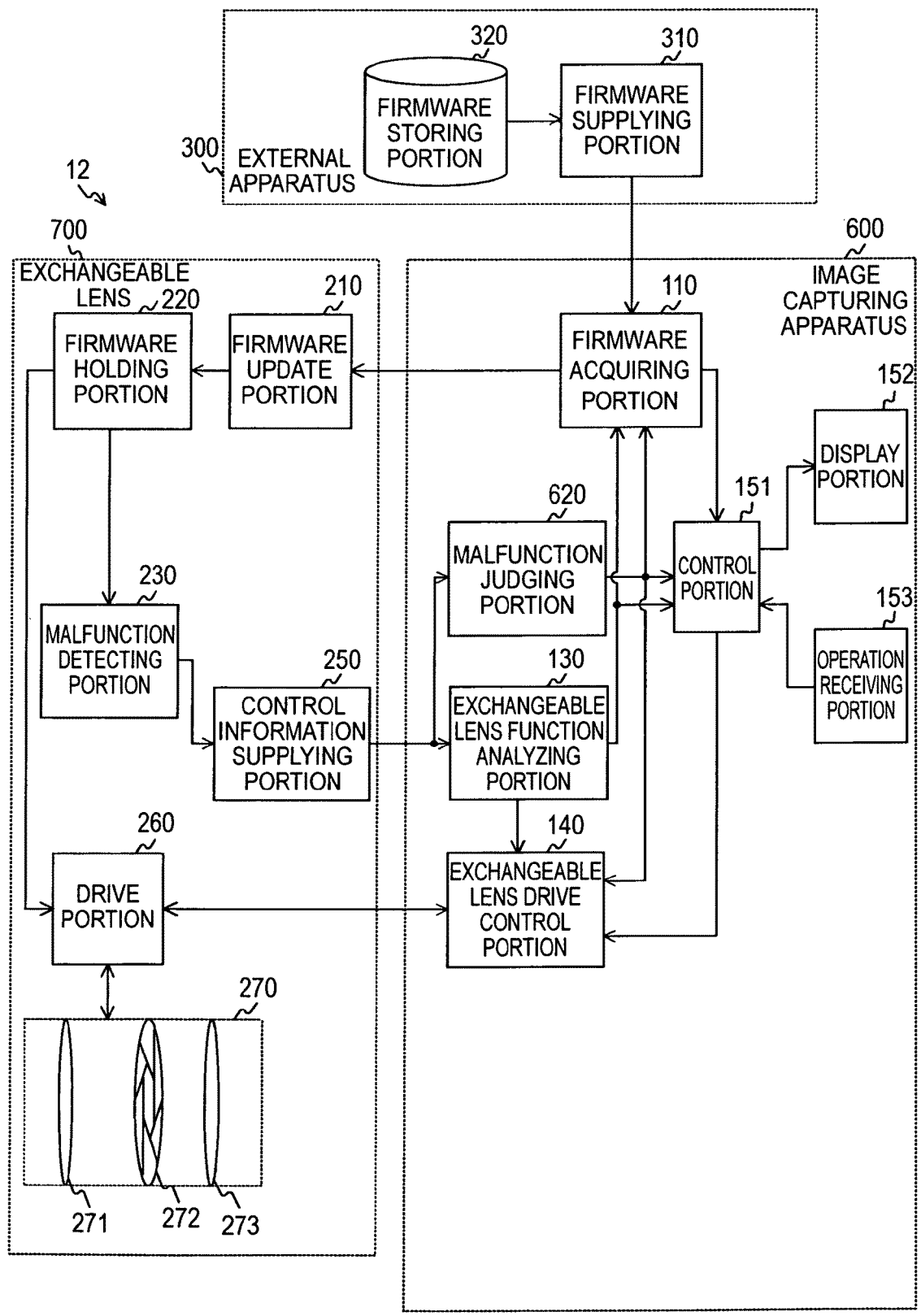
FIG. 11 is a block diagram showing an example of the functional configuration of an imaging system in a third embodiment of the invention.

FIG. 11 is a block diagram showing an example of the functional configuration of an imaging system 12 in the third embodiment of the invention. The imaging system 12 includes an imaging apparatus 600 and an exchangeable lens 700. An external apparatus 300 shown in FIG. 11 along with the imaging system 12 is the same as that shown in FIG. 3. The external apparatus 300 therefore has the same reference character and no description thereof will be made.

The imaging apparatus 600 includes a firmware acquiring portion 110, a malfunction judging portion 620, an exchangeable lens function analyzing portion 130, an exchangeable lens drive control portion 140, a control portion 151, a display portion 152, and an operation receiving portion 153. Those other than the malfunction judging portion 620 are the same as those shown in FIG. 3. They therefore have the same reference characters and no description thereof will be made.

The malfunction judging portion 620 judges whether or not the exchangeable lens firmware held in the exchangeable lens 700 is malfunctioning based on control information supplied from the control information supplying portion 250. For example, the malfunction judging portion 620, when it receives control information representing the functions available in the exchangeable lens 700, supplies malfunction judgment information representing that the exchangeable lens firmware is functioning properly to the firmware acquiring portion 110, the exchangeable lens drive control portion 140, and the control portion 151. Similarly, the malfunction judging portion 620, when it receives control information representing that the exchangeable lens 700 has limited functions, supplies malfunction judgment information representing that the exchangeable lens firmware is malfunctioning to the firmware acquiring portion 110, the exchangeable lens drive control portion 140, and the control portion 151.

The exchangeable lens 700 includes a firmware update portion 210, a firmware holding portion 220, a malfunction detecting portion 230, a control information supplying portion 250, a drive portion 260, and a lens barrel 270. The exchangeable lens 700 does not include the malfunction notification information supplying portion 240 in the exchangeable lens 200 shown in FIG. 3. The components in the exchangeable lens 700 are the same as those in the exchangeable lens 200 shown in FIG. 3. They therefore have the same reference characters and no description thereof will be made.

As described above, providing the malfunction judging portion 620 in the imaging apparatus 600 allows judgment of whether or not the exchangeable lens firmware is malfunctioning to be made based on the control information supplied from the control information supplying portion 250.

[Example of Actions of Imaging System]

Actions of the imaging system 12 in the third embodiment of the invention will next be described with reference to the drawings.

FIG. 12 is a flowchart showing an exemplary exchangeable lens control procedure performed by the imaging apparatus 600 in the third embodiment of the invention. The control procedure is a variation of that shown in FIG. 7 but differs therefrom in that it is judged whether or not the exchangeable lens firmware is malfunctioning based on control information instead of malfunction notification information. Actions other than that described above are the same as those in FIG. 7. The actions common to those in FIG. 7 therefore have the same reference characters, and a description of the actions will be partly omitted.

When the imaging apparatus 600 supplies electric power to the exchangeable lens 700 (step S902), the exchangeable lens function analyzing portion 130 and the malfunction judging portion 620 acquire control information supplied from the exchangeable lens 700 (step S953). The malfunction judging portion 620 subsequently judges whether or not the firmware for the exchangeable lens 700 is functioning properly (step S955). When the judgment result shows (step S955) that the firmware for the exchangeable lens 700 is functioning properly, the control proceeds to step S906.

On the other hand, when the judgment result (step S955) shows that the firmware for the exchangeable lens 700 is not functioning properly, the control proceeds to step S911.

FIG. 13 is a flowchart showing an exemplary drive procedure performed by the exchangeable lens 700 in the third embodiment of the invention. The drive procedure is a variation of that shown in FIG. 8 but differs therefrom in that no malfunction notification information is sent. Actions other than that described above are the same as those in FIG. 8. The actions common to those in FIG. 8 therefore have the same reference characters, and a description of the actions will be partly omitted.

When the control information supplying portion 250 sends control information representing that the exchangeable lens 700 has limited functions (step S926), the firmware update portion 210 judges whether or not exchangeable lens firmware has been supplied from the imaging apparatus 600 (step S928).

When the control information supplying portion 250 sends control information representing the functions available in the exchangeable lens 700 (step S931), the exchangeable lens 700 is initialized based on an initialization instruction from the imaging apparatus 600 (step S933).

As described above, according to the third embodiment of the invention, the imaging apparatus 600 can detect a malfunction associated with the exchangeable lens firmware based on the control information. The imaging apparatus 600 can then automatically update the exchangeable lens firmware based on the detected malfunction.

As described above, according to the embodiments of the invention, the exchangeable lens can detect a malfunction associated with the exchangeable lens firmware and notify the imaging apparatus of the detected malfunction. Further, the imaging apparatus can prevent any malfunction of the exchangeable lens due to the malfunction. That is, according to the embodiments of the invention, a malfunction associated with the firmware held in the exchangeable lens can be resolved appropriately.

The embodiments of the invention have been presented by way of example for implementing the invention, and the items in the embodiments of the invention are related to inventive specific items in the claims, as explicitly indicated in the embodiments of the invention. Similarly, the inventive specific items in the claims are related to the items in the embodiments of the invention that have the same names as those of the inventive specific items. The invention is, however, not limited to the embodiments described above but can be implemented by changing the embodiments in a variety of manners to the extent that the changes do not depart from the substance of the invention.

Each of the procedures described in the embodiments of the invention may be taken as a method including a series of processes of the procedure or may be taken as a program that instructs a computer to carry out the procedure or a recording medium on which the program is recorded. Examples of the recording medium may include a CD (compact disc), an MD (minidisc), a DVD (digital versatile disk), a memory card, and a Blu-Ray Disc®.

The present application contains subject matter related to that disclosed in Japanese Priority Patent Application JP 2010-121915 filed in the Japan Patent Office on May 27, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A device comprising:
an interface configured to communicate with an apparatus to which the device is connected;
a detecting section configured to detect malfunctions of a program stored within a holding section of the device and generate a detection result based on the malfunctions;
a supplying section configured to utilize the detection result to produce and supply support information to the apparatus through the interface, the support information identifying an availability of device operations supported and controlled by the apparatus;
a notifying section configured to supply a notification to the apparatus when the program is malfunctioning based on the detection result; and
an update section configured to update the program with a new program version received from the apparatus in response to the notification;
wherein the new program version includes an updatable area where data is rewritten when the update section updates the program and a non-updatable area where data is not rewritten even when the update section updates the program, and the detecting section detects a malfunction in the updatable area, and
wherein the device is an exchangeable lens attachable to and detachable from the apparatus,
the updatable area stores data on actions of a driving section that drives each optical member in the exchangeable lens,
the non-updatable area stores data for detecting a malfunction in the exchangeable lens and data for controlling the communication with the apparatus when the malfunction has been detected, and
the detecting section detects a malfunction in the data stored in the updatable area based on the data stored in the non-updatable area.

2. The device according to claim 1,
wherein when the detecting section has detected a malfunction, the supplying section supplies the support information to the apparatus identifying that the availability of a device operation particular to the malfunction can no longer be supported and controlled by the apparatus.

3. The device according to claim 1,
wherein when the detecting section has detected no malfunction, the supplying section supplies the support information to the apparatus identifying that all device operations can be supported and controlled by the apparatus.

4. The device according to claim 1,
wherein the device is an exchangeable lens attachable to and detachable from the apparatus, and
wherein the apparatus is an imaging device.

5. The device according to claim 1,
wherein the program is firmware for the device.

6. A system comprising:
a device including
an interface configured to communicate with an apparatus to which the device is connected;
a detecting section configured to detect malfunctions of a program stored within a holding section of the device and generate a detection result based on the malfunctions;
a supplying section configured to utilize the detection result to produce and supply support information to the apparatus through the interface, the support information identifying an availability of device operations supported and controlled by the apparatus;
a notifying section configured to supply a notification to the apparatus when the program is malfunctioning based on the detection result; and
an update section configured to update the program with a new program version received from the apparatus in response to the notification;
wherein the new program version includes an updatable area where data is rewritten when the update section updates the program and a non-updatable area where data is not rewritten even when the update section updates the program, and the detecting section detects a malfunction in the updatable area, and
wherein the device is an exchangeable lens attachable to and detachable from the apparatus,
the updatable area stores data on actions of a driving section that drives each optical member in the exchangeable lens,
the non-updatable area stores data for detecting a malfunction in the exchangeable lens and data for controlling the communication with the apparatus when the malfunction has been detected, and
the detecting section detects a malfunction in the data stored in the updatable area based on the data stored in the non-updatable area.

7. The system of claim 6, further comprising:
an apparatus including an acquiring section configured to access the device to acquire the support information identifying an availability of device operations supported and controlled by the apparatus and the malfunction notification information identifying whether the program of the device is malfunctioning; and
a determining section configured to determine whether to update the program based on the acquired support information and the acquired malfunction notification information.

8. The system according to claim 7,
the determining section being further configured to update the program when the malfunction notification information identifies that the program is malfunctioning or when the support information identifies a non-availability of at least one device operation.

9. The system according to claim 7,
further comprising an initialization information supplying section to supply the device with initialization information that initializes the device when the malfunction notification information identifies that the program is malfunctioning.

10. The system according to claim 7,
wherein the device is an exchangeable lens attachable to and detachable from the apparatus, and
wherein the apparatus is an imaging device.

11. A device comprising:
an interface configured to communicate with an apparatus to which the device is connected;
a processor; and
a memory, the memory storing program code executable by the processor to perform operations comprising:
detecting malfunctions of a particular program stored within a storage area of the device and generating a detection result based on the malfunctions;
utilizing the detection result to produce and supply support information to the apparatus through the interface, the support information identifying an availability of device operations supported and controlled by the apparatus;
supplying a notification to the apparatus when the particular program is malfunctioning based on the detection result; and
updating the particular program with a new program version received from the apparatus in response to the notification;
wherein the new program version includes an updatable area where data is rewritten when said updating updates the particular program and a non-updatable area where data is not rewritten even when said updating updates the particular program, and said detecting malfunctions detects a malfunction in the updatable area, and
wherein the device is an exchangeable lens attachable to and detachable from the apparatus,
the updatable area stores data on actions of driving each optical member in the exchangeable lens,
the non-updatable area stores data for detecting a malfunction in the exchangeable lens and data for controlling the communication with the apparatus when the malfunction has been detected, and
said detecting malfunctions detects a malfunction in the data stored in the updatable area based on the data stored in the non-updatable area.

12. The device according to claim 11,
wherein when said detecting has detected a malfunction, said supplying the notification comprises supplying the support information to the apparatus identifying that the availability of a device operation particular to the malfunction can no longer be supported and controlled by the apparatus.

13. The device according to claim 11,
wherein when said detecting has detected no malfunction, said supplying the notification comprises supplying the support information to the apparatus identifying that all device operations can be supported and controlled by the apparatus.

14. The device according to claim 11,
wherein the device is an exchangeable lens attachable to and detachable from the apparatus, and
wherein the apparatus is an imaging device.

15. A non-transitory computer readable medium storing program code for controlling communication between a device and an apparatus to which the device is connected, the program code being executable by a processor to perform operations comprising:
detecting malfunctions of a particular program stored within a storage area of the device and generating a detection result based on the malfunctions;
utilizing the detection result to produce and supply support information to the apparatus through the interface, the support information identifying an availability of device operations supported and controlled by the apparatus;
supplying a notification to the apparatus when the particular program is malfunctioning based on the detection result; and
updating the particular program with a new program version received from the apparatus in response to the notification;
wherein the new program version includes an updatable area where data is rewritten when said updating updates the particular program and a non-updatable area where data is not rewritten even when said updating updates the particular program, and said detecting malfunctions detects a malfunction in the updatable area, and
wherein the device is an exchangeable lens attachable to and detachable from the apparatus,
the updatable area stores data on actions of driving each optical member in the exchangeable lens,
the non-updatable area stores data for detecting a malfunction in the exchangeable lens and data for controlling the communication with the apparatus when the malfunction has been detected, and
said detecting malfunctions detects a malfunction in the data stored in the updatable area based on the data stored in the non-updatable area.

16. The computer readable medium according to claim 15,
wherein when said detecting has detected a malfunction, said supplying the notification comprises supplying the support information to the apparatus identifying that the availability of a device operation particular to the malfunction can no longer be supported and controlled by the apparatus.

17. The computer readable medium according to claim 15,
wherein when said detecting has detected no malfunction, said supplying the notification comprises supplying the support information to the apparatus identifying that all device operations can be supported and controlled by the apparatus.

18. The computer readable medium according to claim 15,
wherein the device is an exchangeable lens attachable to and detachable from the apparatus, and
wherein the apparatus is an imaging device.

19. A method for controlling communication between a device and an apparatus to which the device is connected, the method comprising:
detecting, by one or more processing units, malfunctions of a particular program stored within a storage area of the device and generating a detection result based on the malfunctions;
utilizing, by said one or more processing units, the detection result to produce and supply support information to the apparatus through the interface, the support information identifying an availability of device operations supported and controlled by the apparatus;
supplying, by said one or more processing units, a notification to the apparatus when the particular program is malfunctioning based on the detection result; and updating, by said one or more processing units, the particular program with a new program version received from the apparatus in response to the notification;

wherein the new program version includes an updatable area where data is rewritten when said updating updates the particular program and a non-updatable area where data is not rewritten even when said updating updates the particular program, and said detecting malfunctions detects a malfunction in the updatable area, and wherein the device is an exchangeable lens attachable to and detachable from the apparatus, the updatable area stores data on actions of driving each optical member in the exchangeable lens, the non-updatable area stores data for detecting a malfunction in the exchangeable lens and data for controlling the communication with the apparatus when the malfunction has been detected, and said detecting malfunctions detects a malfunction in the data stored in the updatable area based on the data stored in the non-updatable area.

20. The method according to claim 19, wherein when said detecting has detected a malfunction, said supplying the notification comprises supplying the support information to the apparatus identifying that the availability of a device operation particular to the malfunction can no longer be supported and controlled by the apparatus.

21. The method according to claim 19, wherein when said detecting has detected no malfunction, said supplying the notification comprises supplying the support information to the apparatus identifying that all device operations can be supported and controlled by the apparatus.

22. The method according to claim 19, wherein the device is an exchangeable lens attachable to and detachable from the apparatus, and wherein the apparatus is an imaging device.

* * * * *